US010452881B2

(12) United States Patent
Gnan et al.

(10) Patent No.: US 10,452,881 B2
(45) Date of Patent: Oct. 22, 2019

(54) MACHINE-READABLE SYMBOL READER WITH DISTRIBUTED ILLUMINATION AND/OR IMAGE CAPTURE

(71) Applicant: DATALOGIC IP TECH, S.R.L., Bologna (IT)

(72) Inventors: Marco Gnan, Bologna (IT); Michele Suman, Padua (IT)

(73) Assignee: Datalogic IP Tech, S.r.l., Bologna (IT)

( * ) Notice: Subject to any disclaimer, the term of this patent is extended or adjusted under 35 U.S.C. 154(b) by 29 days.

(21) Appl. No.: 15/266,766

(22) Filed: Sep. 15, 2016

(65) Prior Publication Data

US 2018/0075269 A1    Mar. 15, 2018

(51) Int. Cl.
*G06K 7/10*    (2006.01)
*G06K 7/08*    (2006.01)

(52) U.S. Cl.
CPC ......... *G06K 7/10831* (2013.01); *G06K 7/089* (2013.01); *G06K 7/1096* (2013.01); *G06K 7/10574* (2013.01); *G06K 7/10683* (2013.01); *G06K 7/10881* (2013.01)

(58) Field of Classification Search
CPC .......... G06K 7/10831; G06K 7/10881; G06K 7/089; G06K 7/10574; G06K 7/10683; G06K 7/1096; G06K 2007/10524
See application file for complete search history.

(56) References Cited

U.S. PATENT DOCUMENTS

| | | | | |
|---|---|---|---|---|
| 3,685,723 A * | 8/1972 | Berler | ............... | G06K 7/10881 235/462.45 |
| 5,361,158 A * | 11/1994 | Tang | ........................ | G06K 7/12 235/462.4 |
| 5,473,149 A * | 12/1995 | Miwa | ................. | G06K 7/10811 235/462.22 |
| 5,477,044 A | 12/1995 | Aragon | | |
| 5,594,228 A * | 1/1997 | Swartz | ..................... | G06K 7/10 235/383 |
| 5,598,007 A * | 1/1997 | Bunce | ............... | G06K 7/10574 235/462.21 |
| 5,684,290 A * | 11/1997 | Arackellian | ....... | G06K 7/10722 235/462.42 |
| 5,783,811 A * | 7/1998 | Feng | ........................ | G01J 3/51 235/462.42 |
| 5,808,286 A * | 9/1998 | Nukui | ................ | G06K 7/10881 235/454 |
| 6,000,612 A * | 12/1999 | Xu | ..................... | G06K 7/10722 235/454 |
| 6,000,617 A * | 12/1999 | Swartz | ............... | G06K 7/10881 235/462.2 |

(Continued)

OTHER PUBLICATIONS

Extended European Search Report from corresponding European Application No. 17191402.1, dated Feb. 12, 2018, 7 pages.

*Primary Examiner* — Daniel I Walsh
(74) *Attorney, Agent, or Firm* — Cozen O'Connor

(57) ABSTRACT

A machine readable symbol reader can provide illumination form portions other than or in addition to the head of the reader, to enhance the ability to successfully read machine-readable symbols, for example symbols on curved surfaces and/or DPM symbols. A machine readable symbol reader include a first set of receiving optics in a head of the reader and a second set of receiving optics in a portion of the reader other than the head, to provide an alternative line of sight or field of view.

35 Claims, 12 Drawing Sheets

(56) References Cited

U.S. PATENT DOCUMENTS

| | | | | |
|---|---|---|---|---|
| 6,003,775 A * | 12/1999 | Ackley | G06K 7/1098 | 235/462.47 |
| 6,164,546 A * | 12/2000 | Kumagai | G06K 7/10594 | 235/462.32 |
| 6,501,547 B1 * | 12/2002 | Spencer | G01J 3/28 | 235/462.06 |
| 8,590,795 B2 * | 11/2013 | Vincenzi | G06K 7/109 | 235/472.02 |
| 8,763,909 B2 * | 7/2014 | Reed | G06K 7/0004 | 235/449 |
| 9,507,987 B1 * | 11/2016 | Strat | G06K 7/1098 | |
| 9,667,761 B2 * | 5/2017 | Barkan | H04M 1/0254 | |
| 9,858,461 B2 * | 1/2018 | Utykanski | G06K 7/10722 | |
| 2005/0011956 A1 * | 1/2005 | Carlson | G06K 7/10732 | 235/462.42 |
| 2005/0279836 A1 * | 12/2005 | Havens | G06K 7/10574 | 235/472.01 |
| 2006/0163355 A1 * | 7/2006 | Olmstead | G06K 7/10752 | 235/454 |
| 2006/0266825 A1 * | 11/2006 | Do | G06K 17/0022 | 235/383 |
| 2007/0040035 A1 * | 2/2007 | Kotlarsky | G06K 7/10683 | 235/462.45 |
| 2007/0057067 A1 * | 3/2007 | He | G06K 7/10851 | 235/462.45 |
| 2007/0278302 A1 * | 12/2007 | Wakabayashi | G06K 7/10732 | 235/454 |
| 2007/0295814 A1 * | 12/2007 | Tanaka | G06K 7/10722 | 235/454 |
| 2008/0078839 A1 * | 4/2008 | Barkan | G06K 7/10554 | 235/470 |
| 2008/0105745 A1 * | 5/2008 | Lei | G06K 7/10722 | 235/462.1 |
| 2008/0105746 A1 * | 5/2008 | Lei | G06K 7/10722 | 235/462.11 |
| 2008/0105748 A1 * | 5/2008 | Lei | G06K 7/10722 | 235/462.42 |
| 2010/0073869 A1 * | 3/2010 | Mangaroo | G06K 7/0004 | 361/679.55 |
| 2010/0078481 A1 * | 4/2010 | Trajkovic | G06K 7/10722 | 235/462.41 |
| 2011/0036911 A1 * | 2/2011 | Havens | G06K 7/10722 | 235/470 |
| 2011/0049243 A1 * | 3/2011 | Gong | G06K 7/10851 | 235/462.48 |
| 2011/0089245 A1 * | 4/2011 | Havens | G06K 7/10811 | 235/472.01 |
| 2011/0163165 A1 * | 7/2011 | Liu | G06K 7/10594 | 235/472.01 |
| 2012/0118972 A1 * | 5/2012 | Ferren | G02B 13/0065 | 235/462.21 |
| 2014/0008440 A1 * | 1/2014 | Patil | G06K 7/10801 | 235/462.21 |
| 2014/0233180 A1 * | 8/2014 | Vargas | G06F 1/1613 | 361/679.55 |
| 2015/0009542 A1 * | 1/2015 | Zhao | H04N 1/00331 | 358/462 |
| 2015/0028104 A1 * | 1/2015 | Ma | H04M 1/72522 | 235/462.08 |
| 2015/0229907 A1 * | 8/2015 | Bridges | G01B 21/047 | 348/46 |
| 2015/0317503 A1 * | 11/2015 | Powell | G06K 7/10831 | 235/455 |
| 2016/0180129 A1 * | 6/2016 | Utykanski | G06K 7/10722 | 235/462.42 |
| 2016/0350566 A1 * | 12/2016 | Ye | G06K 7/10732 | |
| 2018/0059758 A1 * | 3/2018 | Boatner | G06K 7/10881 | |
| 2018/0218189 A1 * | 8/2018 | MA | H04M 1/72522 | |
| 2019/0057232 A1 * | 2/2019 | Ren | G06K 7/10742 | |

* cited by examiner

MACHINE-READABLE SYMBOL READER WITH DISTRIBUTED ILLUMINATION AND/OR IMAGE CAPTURE

BACKGROUND

Technical Field

The present disclosure relates to machine-readable symbol readers that illuminate and optically read machine-readable symbols.

Description of the Related Art

Machine-readable symbols encode information in a form that can be optically read via machine-readable symbol reader. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically composed of patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, may include more than two colors (e.g., more than black and white). Machine-readable symbols may include directly marked materials direct part marking or DPM) having the symbols formed in surface relief (e.g., etched or otherwise inscribed in a surface).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relatively narrow beam or spot of light sequentially across the machine-readable symbol. Machine-readable symbol readers are commonly referred to as a "scanner" or "barcode scanner" whether they employ flood illumination or a scanning laser beam, or whether they read one-dimensional or two-dimensional machine-readable symbols.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal or digital value having an amplitude determined by the intensity of the collected light. Relatively less reflective or darker regions (e.g., bars or other marks) may, for example, be characterized or represented in the electrical signal or digital value by an amplitude below a threshold amplitude, while relatively more reflective or lighter regions (e.g., white spaces) may be characterized or represented in the electrical signal or digital value by an amplitude above the threshold amplitude. When the machine-readable symbol is scanned using laser or "flying spot," positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

One of the most difficult tasks for conventional machine-readable symbol readers is to read a machine-readable symbol marked on a curved surface (e.g., curved surface of a cylindrical can), and in particular a direct part marking (DPM) machine-readable symbol inscribed on a curved surface.

BRIEF SUMMARY

Conventional handheld machine-readable symbol readers typically locate both the receiving optics and the illumination source(s) in a head of the handheld machine-readable symbol reader. Applicants have recognized that consequently, conventional handheld machine-readable symbol readers can typically decode DPM machine-readable symbols only at distances that are very close to a front or "nose" of the head of the conventional handheld machine-readable symbol reader. At longer distances, the illumination provided by the illumination sources and reflected by curved metal surfaces create a thin bright reflection stripe that tends to "blind" the light sensor or light detector of conventional handheld machine-readable symbol readers.

To address this limitation, Applicants have developed an innovative solution that provides illumination into the environment from a larger angle than that of conventional handheld machine-readable symbol readers. In particular, various implementations described herein provide illumination from portions of a handheld machine-readable symbol readers in addition to, or in lieu of, the head of the handheld machine-readable symbol reader. Such can, for example, include providing illumination from a portion of a handle or an extension that extends from a handle and/or extends from a head of the handheld machine-readable symbol reader. Such can more uniformly illuminate a surface in the environment and any machine-readable symbols carried by the surface, for example a DPM symbol inscribed in or on a curved or cylindrical surface. Such can also allow for successful reading at larger distances than otherwise possible by conventional handheld machine-readable symbol readers which co-locate the reading optics and illumination in the relatively confined volume of a head of a handheld machine-readable symbol reader. These larger distances may advantageously be distances that are more natural for a user of the handheld machine-readable symbol reader.

Additionally or alternatively, additional light or image receiving optics and/or sensors can be advantageously spaced relatively away from a head of a handheld machine-readable symbol reader, for example by locating an entrance pupil of the light or image receiving optics and/or sensors in a portion of a handle or an extension that extends from a handle and/or extends from a head of the handheld machine-readable symbol reader.

Clause 1: A machine-readable symbol reader may be summarized as including a body, the body including a handle and a head, the handle having a base, a major axis and including a portion that extends along the major axis of the handle and that is sized and dimensioned to be gripped by a human hand during use of the machine-readable symbol reader, and the head having a major axis, the head which extends laterally at least in a forward direction from the handle at a junction of the handle and the head, the head including a first window that faces in the forward direction and that provides a first return path for light returned from an exterior of the body of the machine-readable symbol reader; at least a first light sensor housed in the body and positioned in the first return path; and at least a first light source physically coupled to the body, wherein light produced by at least the first light source light emits from at least a light emission portion of the body outwardly from the body of the machine-readable symbol reader into the exterior, the light emission portion of the body positioned relatively below the junction where the head extends from the handle.

Clause 2: The machine-readable symbol reader of clause 1 wherein the light emission portion of the body is spaced relatively below a plane that passes through the junction where the head extends from the handle and that does not intersect the major axis of the head.

Clause 3: The machine-readable symbol reader of any of clauses 1 or 2 may further include a trigger attached to the body proximate the junction between the handle and the head, the trigger positioned to be actuatable by a finger when the human hand grips the handle, at least one of the first light source or the first light sensor response to actuation of the trigger to respectively emit light or sample light returned via the return path.

Clause 4: The machine-readable symbol reader of clause 1 wherein the light emission portion includes an extension of the body that extends from at least one of the handle or the head.

Clause 5: The machine-readable symbol reader of clause 4 wherein the extension extends laterally from the base of the handle in the forward direction, parallel with the head.

Clause 6: The machine-readable symbol reader of clause 4 wherein the extension is an L-shaped extension including a first extension portion that extends laterally from the handle, parallel with the head, and a second extension portion that extends from the head, parallel with the handle.

Clause 7: The machine-readable symbol reader of any of clauses 5 or 6 wherein, in addition to the first light source, the machine-readable symbol reader includes a plurality of additional light sources, the first and the additional light sources distributed along the extension and oriented to emit light forwardly outward of the body.

Clause 8: The machine-readable symbol reader of any of clauses 5 or 6 wherein the extension includes a plurality of apertures that emit light as a plurality of light point sources distributed along the extension and oriented to emit light forwardly outward of the body.

Clause 9: The machine-readable symbol reader of any of clauses 5 or 6 wherein the extension forms a light pipe and includes a plurality of reflective or refractive structures that emit light as a plurality of light point sources distributed along the extension and oriented to emit light forwardly outward of the body.

Clause 10: The machine-readable symbol reader of any of clauses 5 or 6 wherein the extension includes a light transmissive conduit and emits light forwardly outward of the body along at least a portion of the extension.

Clause 11: The machine-readable symbol reader of clause 10 wherein the light is emitted along an entire distance between a first location on the extension and a second location on the extension, the second location spaced from the first location.

Clause 12: The machine-readable symbol reader of any of clauses 5 or 6 wherein the light is emitted at respective distinct locations spaced along the extension.

Clause 13: The machine-readable symbol reader of clause 12 wherein the respective locations are spaced a distance h from an optical axis given by a formula $$\frac{h}{r} - \frac{v}{r} -$$

$$\sin\phi - \left[\frac{d}{r} + (1-\cos\phi)\right]\tan\left\{2\phi + a\tan\left[\frac{\sin\phi + \frac{v}{r}}{\frac{n+d}{r} + (1-\cos\phi)}\right] - \Delta\alpha\right\} = 0,$$

where r may be a radius of a curved surface of a target object, d may be a distance of the object from the projection (N) of the position of the light source $C_1$-$C_m$ on the optical axis, n may be the distance from N to the main optics entrance pupil of the machine-readable symbol reader, and v is a distance of a lateral displacement of a center of the target object (e.g., centerline of cylinder) from the optical axis of the optical system.

Clause 14: The machine-readable symbol reader of clause 12 wherein a first point source is at a bottom of the head spaced from the window by 10.0 mm, a second point source is spaced relatively below the head spaced from the window by 13.5 mm, a third point source is spaced relatively below the head spaced from the window by 17.1 mm, and a fourth point source is spaced relatively below the head spaced from the window by 20.7 mm.

Clause 15: The machine-readable symbol reader of clause 14 wherein a fifth point source is spaced relatively below the head spaced from the window by 24.5 mm, a sixth point source is spaced relatively below the head spaced from the window by 28.7 mm, a seventh point source is spaced relatively below the head spaced from the window by 33.2 mm; an eight point source is spaced relatively below the head spaced from the window by 38.4 mm, a ninth point source is spaced relatively below the head spaced from the window by 44.5 mm, a tenth point source is spaced relatively below the head spaced from the window by 52.3 mm, and an eleventh point source is spaced relatively below the head spaced from the window by 62.8 mm.

Clause 16: The machine-readable symbol reader of any of clauses 5 or 6 wherein the extension includes a second window that faces in the forward direction and that provides a second return path for light returned from an exterior of the body of the machine-readable symbol reader, and may further include a second light sensor, where the first light sensor is positioned in the head and the second light sensor is positioned in at least one of the handle or the extension.

Clause 17: The machine-readable symbol reader of clauses 1 or 2, further including at least a second light source physically coupled to the body, wherein light produced by at least the second light source light emits from at least a light emission portion of the body outwardly from the body of the machine-readable symbol reader into the exterior, the light emission portion of the body positioned relatively below the junction where the head extends from the handle.

Clause 18: The machine-readable symbol reader of clause 17 wherein the first light source is positioned at least proximate the base of the handle, and the second light source being positioned in the head proximate a junction between the head and the extension.

Clause 19: The machine-readable symbol reader of clauses 1 or 2 wherein the first light source is positioned in the head.

Clause 20: The machine-readable symbol reader of clauses 1 or 2 wherein the first light source is positioned at least proximate the base of the handle.

Clause 21: The machine-readable symbol reader of clauses 1 or 2 wherein the first light sensor is a charge coupled device, and may further including a decode engine communicatively coupled to the charge coupled device, and operable to decode images captured by the charge coupled device.

Clause 22: A machine-readable symbol reader may be summarized as including a body, the body including a handle and a head, the handle having a base, a major axis and including a portion that extends along the major axis of the handle, portion that extends along the major axis sized and dimensioned to be gripped by a human hand during use of the machine-readable symbol reader, and the head having a major axis, the head which extends laterally at least in a forward direction from the handle at a junction of the handle and the head; a first set of receiving optics having a first field of view that emanates from the head of the body and that provides a first return path for light returned from an exterior of the body of the machine-readable symbol reader to the head; and a second set of receiving optics having a second field of view that emanates from a portion of the body that other than the head and that provides a second return path for light returned from the exterior of the body of the machine-readable symbol reader to the portion of the body other than the head, the second return path different from the first return path; and at least a first light sensor housed by the body and operable to sense light returned from the exterior of the body of the machine-readable symbol reader.

Clause 23: The machine-readable symbol reader of clause 22 wherein the first light sensor is operable to sense light returned from the exterior of the body of the machine-readable symbol reader via the first return path and may further include at least a second light sensor housed by the body and operable to sense light returned from the exterior of the body of the machine-readable symbol reader via the second return path.

Clause 24: The machine-readable symbol reader of clause 22 wherein the first set of receiving optics are housed in the head of the body of the machine-readable symbol reader.

Clause 25: The machine-readable symbol reader of clauses 22 or 24 wherein the second set of receiving optics are housed in the handle of the body of the machine-readable symbol reader.

Clause 26: The machine-readable symbol reader of clause 25 further including at least a first light source physically coupled to the body, wherein light produced by at least the first light source light emits from at least a light emission portion of the body outwardly from the body of the machine-readable symbol reader into the exterior, the light emission portion of the body positioned relatively below the junction where the head extends from the handle.

Clause 27: The machine-readable symbol reader of clause 26 wherein the light emission portion of the body is spaced relatively below a plane that passes through the junction where the head extends from the handle and that does not intersect the major axis of the head.

Clause 28: The machine-readable symbol reader of clause 26 wherein the light emission portion includes an extension of the body that extends from at least one of the handle or the head.

Clause 29: The machine-readable symbol reader of clause 28 wherein the extension extends laterally from the base of the handle in the forward direction, parallel with the head.

Clause 30: The machine-readable symbol reader of clause 28 wherein the extension is an L-shaped extension including a first extension portion that extends laterally from the handle, parallel with the head, and a second extension portion that extends from the head, parallel with the handle.

Clause 31: The machine-readable symbol reader of any of clauses 29 or 30 wherein, in addition to the first light source, the machine-readable symbol reader includes a plurality of additional light sources, the first and the additional light sources distributed along the extension and oriented to emit light forwardly outward of the body.

Clause 32: The machine-readable symbol reader of any of clauses 29 or 30 wherein the extension includes a plurality of apertures that emit light as a plurality of light point sources distributed along the extension and oriented to emit light forwardly outward of the body.

Clause 33: The machine-readable symbol reader of any of clauses 29 or 30 wherein the extension forms a light pipe and includes a plurality of reflective or refractive structures that emit light as a plurality of light point sources distributed along the extension and oriented to emit light forwardly outward of the body.

Clause 34: The machine-readable symbol reader of any of clauses 29 or 30 wherein the extension includes a light transmissive conduit and emits light forwardly outward of the body along at least a portion of the extension.

Clause 35: The machine-readable symbol reader of clause 34 wherein the light is emitted along an entire distance between a first location on the extension and a second location on the extension, the second location spaced from the first location.

Clause 36: The machine-readable symbol reader of any of clauses 29 or 30 wherein the light is emitted at respective distinct locations spaced along the extension.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

Figure 1:
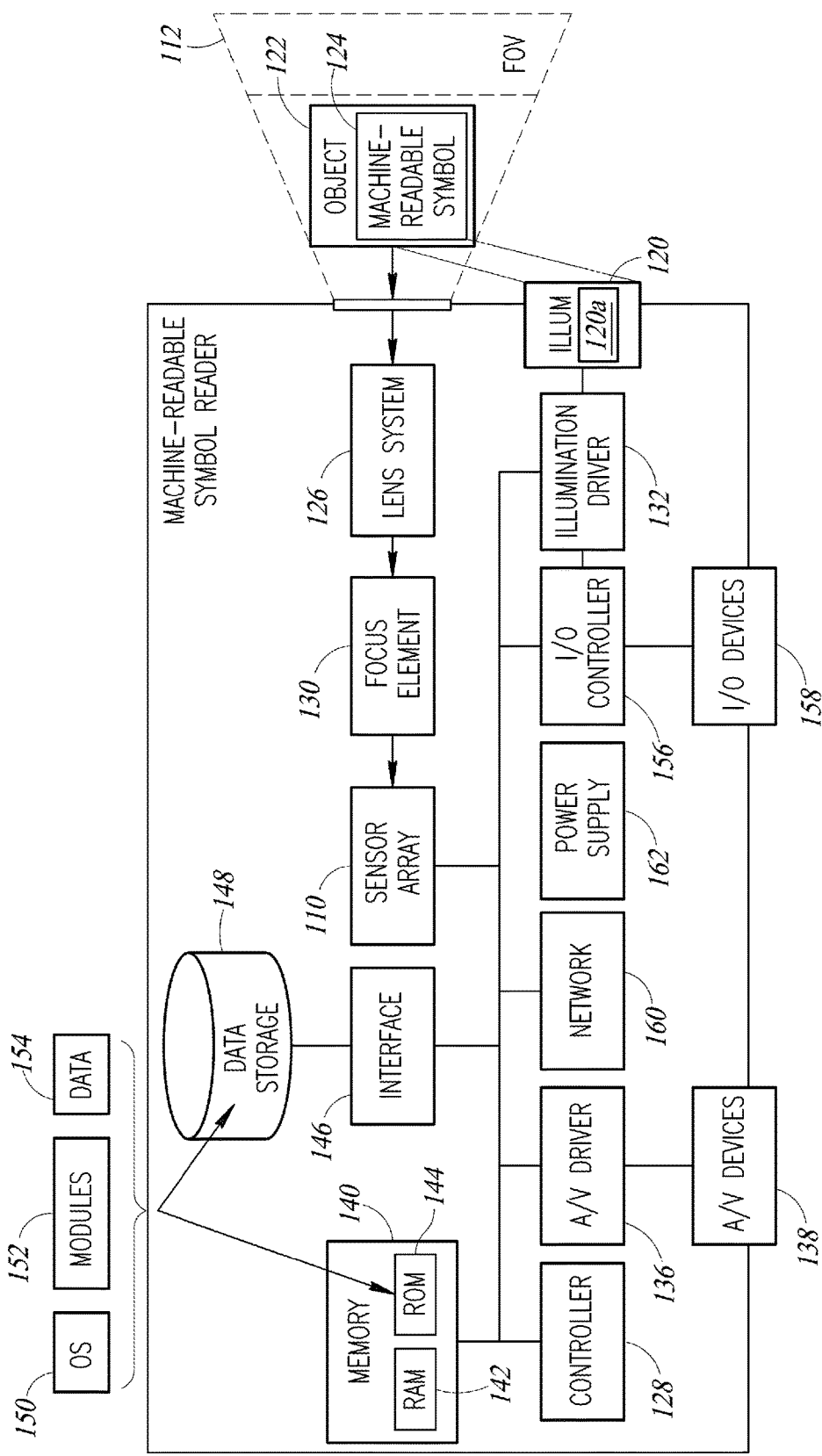
FIG. 1 is a block diagram of a machine-readable symbol reader and an object bearing a machine-readable symbol to be read, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the machine-readable symbol readers have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

As used in this specification and the appended claims, the terms "active light source" or "active illumination source" mean a device or structure that generates light. Examples of active light sources or active illumination sources include, but are not limited to light emitting diodes (LEDs), flash strobes, incandescent or fluorescent lamps, or halogen bulbs. Such are typically responsive to some stimulus, for example an electric current or voltage.

As used in this specification and the appended claims, the terms "passive light source" or "passive illumination source" mean a device or structure that emits light but does not itself generate light. Examples of passive light sources or passive illumination sources include, but are not limited to optical waveguides (e.g., cylindrical waveguide, rectangular waveguide), light pipe, light transmissive substrates, reflectors, refractors, prisms, lenses, nanocrystalline structures. Such are typically illuminated by an active illumination or light source.

The terms "point source" or "point source of light" or "point source of illumination" means specifically definable locations or sources of light emission into the exterior environment from a machine-readable symbol reader, generally in a forward direction, typically to illuminate an object bearing a machine-readable symbol. Notably, a number of active light sources can each form a respective one of a set of point sources. Alternatively, a number of passive light sources can each form a respective one of a set of point sources.

The headings and Abstract of the Disclosure provided herein are for convenience only and do not limit the scope or meaning of the embodiments.

FIG. 1 is a block diagram of a machine-readable symbol reader 100, according to one implementation. The machine-readable symbol reader 100 includes an image sensor or sensor array 110, which can capture images of a field of view 112 through a window 116. The field of view 112 can be focused onto the sensor array 110. Image frames captured by the sensor array 110 may include light emanating from one of the field of view 112.

The machine-readable symbol reader 100 includes one or more active light or illumination sources 120, which are operable to generate light and illuminate the field of view 112 in a forward direction (i.e., in front of a nose of the machine-readable symbol reader 100). The active illumination source(s) 120 can comprise any suitable source of light, such as one or more light emitting diodes (LEDs), flash strobes, incandescent or fluorescent lamps, or halogen bulbs. The active illumination source(s) 120 may generate light having one or more wavelengths or ranges of wavelength. The active illumination source(s) 120 can pass light or illumination through an optical element 120a prior to passing out of the machine-readable symbol reader 100 into an exterior or external environment. As described elsewhere herein, in some implementations the optical element 200 can take the form of a waveguide or other light transmissive structure.

As described with respect to specific implementations, a machine-readable symbol reader 100 can advantageously include an active or passive illumination source that emits light or illumination from portion of then a head of the machine-readable symbol reader 100, for instance from a position spaced relatively below the head of the machine-readable symbol reader 100, thereby providing a larger angle of illumination than otherwise possible via conventional machine-readable symbol readers. For example, an active or passive illumination source emit light from a handle of the machine-readable symbol reader 100. Also for example, one or more active or passive illumination sources can emit light from an extension that extends from a handle and/or that extends from a head of the machine-readable symbol reader 100. In some implementations, the active or passive illumination sources may be spaced relative to one another to form distinct point sources of light. In other implementations, one or more active light sources may provide light to a light transmissive conduit, for instance a light pipe. The light transmissive conduit may emit light at a plurality of spaced locations to form distinct point sources of light. Alternatively, the light transmissive conduit may emit light over an entire length of a portion of the extension between two defined locations. In addition to illumination sources that emit light from portions other than the head of the machine-readable symbol reader 100, one or more active or passive illumination sources can also emit light from the head of the machine-readable symbol reader 100. As noted, these approaches advantageously provide a wider angle of illumination than possible using conventional machine-readable symbol readers, which is particularly useful when reading machine-readable symbols from curved surfaces, and in particular DPM machine-readable symbols from curved surfaces.

FIG. 1 also illustrates an item or object 122 positioned within the field of view 112. The object 122 includes a machine-readable symbol 124 (e.g., PDF417, Code 128, etc.) that is to be detected and/or decoded by the machine-readable symbol reader 100. In particular, the object 122 can have a curved surface which bears the machine-readable symbol 124. For example, the object 122 can be a cylindrical object, or other object with a curved surface. The machine-readable symbol 124 can, for example, take the form of a DPM symbol, etched or otherwise inscribed directly on or in the curved surface of the object 122.

The machine-readable symbol reader 100 optionally includes a lens system 126 positioned and oriented to focus light onto the sensor array 110. For example, the lens system 126 may comprise an array of optics (e.g., optical elements) with a common optical axis. The lens system 126 may also comprise a zoom lens coupled to a controller 128 to control an amount of optical zoom.

The machine-readable symbol reader 100 optionally includes a focal element 130 disposed between the lens system 126 and the sensor array 110 such that at least some of the light rays arrive at the sensor array 110 through the focal element 130. The focal element 130 operates to provide one or more image focus distances for light rays that strike the sensor array 110. For example, in some implementations the focal element 130 is a thin plate of optical glass having a relatively high index of refraction $n_d$ (e.g., $n_d$ between 1.3 to 3.0) positioned over the sensor array 110.

The sensor array 110 forms an electronic image of the field of view 112. The sensor array 110 may comprise a wide range of image or optical sensing devices for converting an optical image (or another wavelength in the electromagnetic spectrum) into an electrical signal or digital representation. For example, the sensor array 110 may comprise a digital sensor, such as a charge-coupled device (CCD) sensor array or complementary metal-oxide semiconductor (CMOS) sensor array, both of which form a one-dimensional or two-dimensional array of pixels, which together constitute an electronic or digital representation of the image. Each pixel location stores data indicative of the light intensity at that location of the image. The light intensity data for each pixel may represent a monochrome intensity (e.g., grayscale), or alternatively a color (e.g., red-green-blue). After the sensor array 110 has been exposed to light emanating from field of view 112, data from all the pixels can be sequentially read out in a selectable pattern (which may be row-by-row, sub-region by sub-region, or some other pattern). The pixel intensity data may optionally be converted to digital form using an analog-to-digital converter (not shown).

Typically, in response to receiving an instruction from a controller 128, the sensor array 110 captures or acquires one or more images of the field of view 112. Conceptually, a read volume of the reader 100 includes a portion of space in front of the window 116 in which machine-readable symbols may be read (e.g., detected and decoded) by the machine-readable symbol reader 100. In other words, the read volume may be referred to as a view volume within which there is a relatively high probability of a successful scan/read. The instruction may be generated in response to a user input, for example an activation (e.g., pull, pressing) of a switch, for example a trigger (not separately illustrated in FIG. 1).

After the sensor array 110 has been exposed to light reflected or otherwise returned by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110, and thus is denominated as a decode engine. The controller 128 may condition the data received from the sensor array 110 and may generate an output that generally identifies which regions of the image correspond to highly reflective or light areas, and which correspond to less reflective or dark areas, for example.

One or more illumination drivers or controllers 132 apply signals to the active illumination source(s) 120 to, for example, strobe the active illumination source(s) 120 at desired times or in response to activation of a trigger by a user, or alternatively to light the active illumination source(s) 120 constantly for a period of time, for instance in response to actuation of a trigger by a user. The active illumination source(s) 120 can be mounted within a housing of the machine-readable symbol reader 100 (e.g., behind window 116), in a handle and/or in an extension.

The sensor array 110 and the illumination driver 132 are communicatively coupled to the controller 128, which may be, for example, one or more of a processor, microprocessor, controller, microcontroller, digital signal processor (DSP), graphical processing unit (GPU), application specific integrated circuit (ASIC), programmable gate array (PGA), or the like (generally "processor"). Some implementations may include a dedicated machine-readable symbol scan module as the controller 128. The communicative coupling may be via a bus 134 or other communication mechanism, such as direct connections of a serial, parallel, or other type. The controller 128 generally controls and coordinates the operation of other devices to which it is connected, such as one or more of the sensor array 110, the illumination driver 132, and an audio/visual (A/V) driver 136. The A/V driver 136 is optionally included to drive one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator device 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal. Some implementations can include a user operable trigger or other switch, operation of which can cause the machine-readable symbol reader 100 to read machine-readable symbols.

The machine-readable symbol reader 100 also includes one or more non-transitory media, for example, memory 140, which may be implemented using one or more standard memory devices. The memory devices 140 may include, for instance, flash memory, RAM 142, ROM 144, and EEPROM devices, and the non-transitory media may also include magnetic or optical storage devices, such as hard disk drives, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or IEEE 1194 connection.

According to one implementation, any number of program modules are stored in the drives (e.g., data storage 148) and the memory 140, including an operating system (OS) 150, one or more application programs or modules 152, such as instructions to implement the methods described herein, and data 154. Any suitable operating system 150 may be employed. One of the program modules 152 may comprise a set of instructions stored on one or more computer- or processor-readable media and executable by one or more processors to implement the methods to generate image data using the data reader 100 and/or decode the image data. The data 154 may include one or more configuration settings or parameters, or may include image data from the sensor array 110 and decoded machine-readable symbol data.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be operable to display a navigable menu system or graphical user interface (GUI) that allows the user to select the illumination and image capture settings.

The I/O controller 156 may receive user input from one or more input devices, such as a trigger, keyboard, a pointing device, or other wired/wireless input devices, that allow the user to, for example, program the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

Optional network interface 160 may provide communications with one or more hosts or other devices (e.g., a computer, a point-of-sale terminal, a point-of-sale computer system, or a cash register). For example, data gathered by or decoded by the machine-readable symbol reader 100 may be passed along to a host computer. According to one implementation, the network interface 160 comprises a universal interface driver application-specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low- or high-powered electromagnetic waves to transmit data using any wireless protocol, such as Bluetooth™, IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other implementations may have less than all of these components, may contain other components, or both. In addition, the machine-readable symbol reader 100 may include a radiofrequency identification (RFID) reader or interrogator and/or a magnetic stripe reader. Such may be particularly useful when employed as a point-of-sale (POS) terminal.

Figure 2:
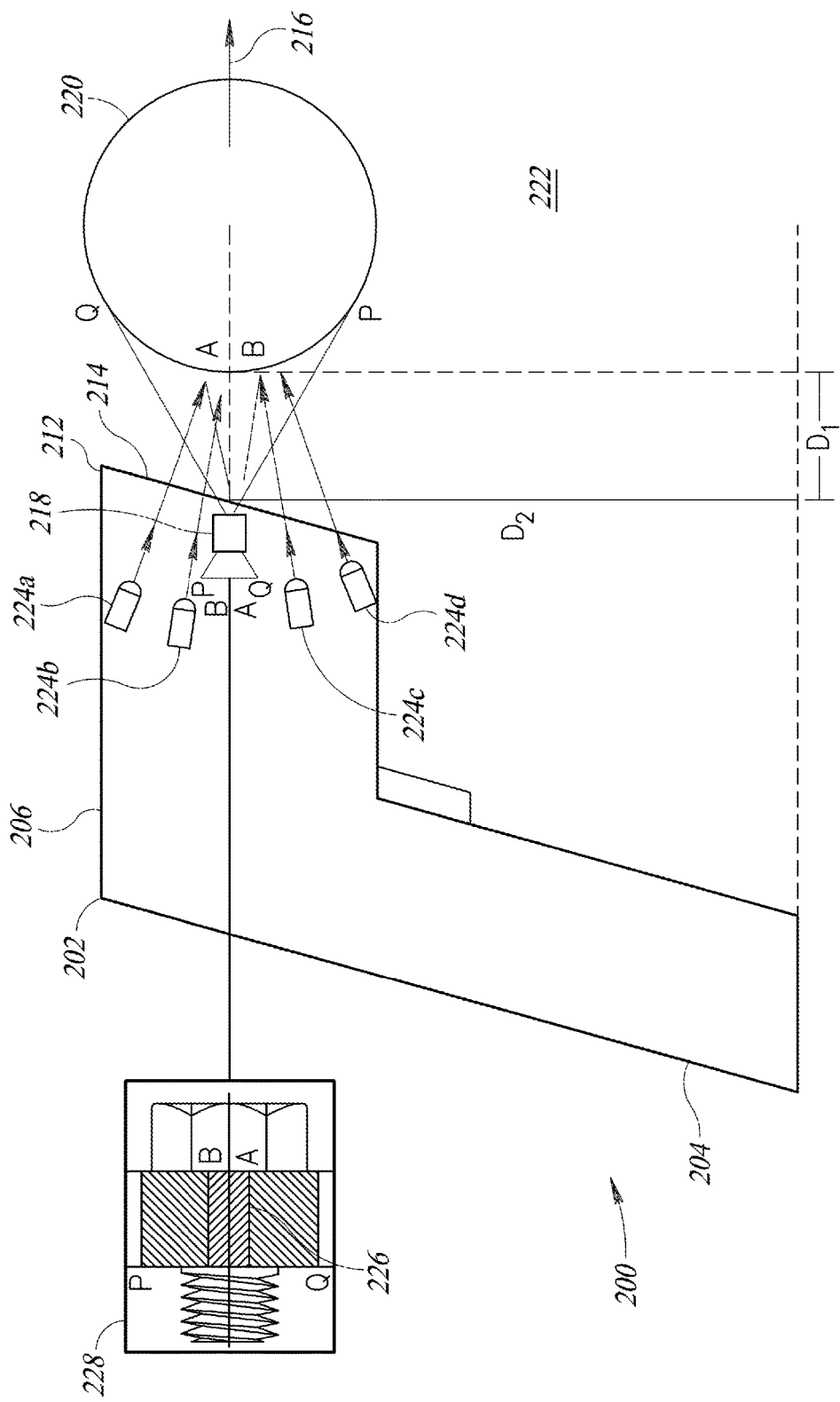
FIG. 2 is a schematic diagram of a conventional machine-readable symbol reader positioned and oriented to transmit illumination in a forward direction to illuminate a cylindrical object bearing a machine-readable symbol on a curved surface of the cylindrical object, and receive returned illumination from the cylindrical object to form an image of at least the machine-readable symbol, according to at least one illustrated embodiment.

FIG. 2 shows a conventional machine-readable symbol reader 200, comprising a housing or body 202 that includes a handle 204 and a head 206.

The head 206 extends from the handle 204. The head 206 includes a front or nose 212, and a window 214 located at the nose 212 and which faces a forward direction (indicated by arrow 216).

The machine-readable symbol reader 200 includes a set of receiving optics and light sensor, collectively 218, located in the head 206. The receiving optics and light sensor 218 are positioned and oriented to receive illumination returned from objects 220 in an exterior environment 222 via the window 214.

The machine-readable symbol reader 200 includes a set of illumination sources 224a, 224b, 224c, 224d (four shown, collectively or individually 224) located in the head 206. The illumination sources 224 are positioned and oriented to emit illumination from the window 214 of the head 206 into the exterior environment 222 to illuminate objects 220 bearing machine-readable symbols 226. The illumination sources 224 are typically arranged symmetrically about the receiving optics and/or light sensor 218.

Typically, the size of a head of a handheld machine-readable symbol reader 200 cannot be increased due to functional and aesthetical reasons. Thus, locating the illumination sources 224 in the head 206 of the machine-readable symbol reader 200 places a limit on the maximum angle of illumination of the surface that is achievable at any given distance from the object 220. In turn this limits the maximum decoding distance, since when the distance to the illuminated surface increases, the illuminated portion becomes smaller and relatively brighter. Eventually, the illuminated portion of the surface becomes a thin stripe that causes blindness of the optical or image sensor.

As illustrated in FIG. 2, the receiving optics and/or light sensor 218 produces image data or an image 228, which represents the object 220 and machine-readable symbol 226 carried by the object 220. As also illustrated in FIG. 2, ray traces A, B, P, Q show the extent of the object 220 that is illuminated at a given distance $D_1$ between the machine-readable symbol reader 200 and the object 220. Notably, the image 228 includes only a portion of the object 220.

DPM decoding in particular, is strongly dependent on the relative angle between surface, illumination optics and receiving optics. When a machine-readable symbol reader 200 does not successfully decode a machine-readable symbol, the user typically moves the machine-readable symbol reader 200 relative to the machine-readable symbol so that the machine-readable symbol reader 200 views the machine-readable symbol at various different angles. Moreover, if a surface has too small a radius then curved or cylindrical surfaces cannot be seen completely or illuminated uniformly by the optics in the head of machine-readable symbol reader 200.

FIG. 2 further illustrates a dimension $D_2$ of the machine-readable symbol reader 200 which is available to advantageously provide a wider angle of illumination as taught below via various exemplary implementations. This dimension is additionally or alternatively available to advantageously provide an alternative field of view of sight line, in addition to that of a primary set of receiving optics and light sensor 218.

Figure 3:
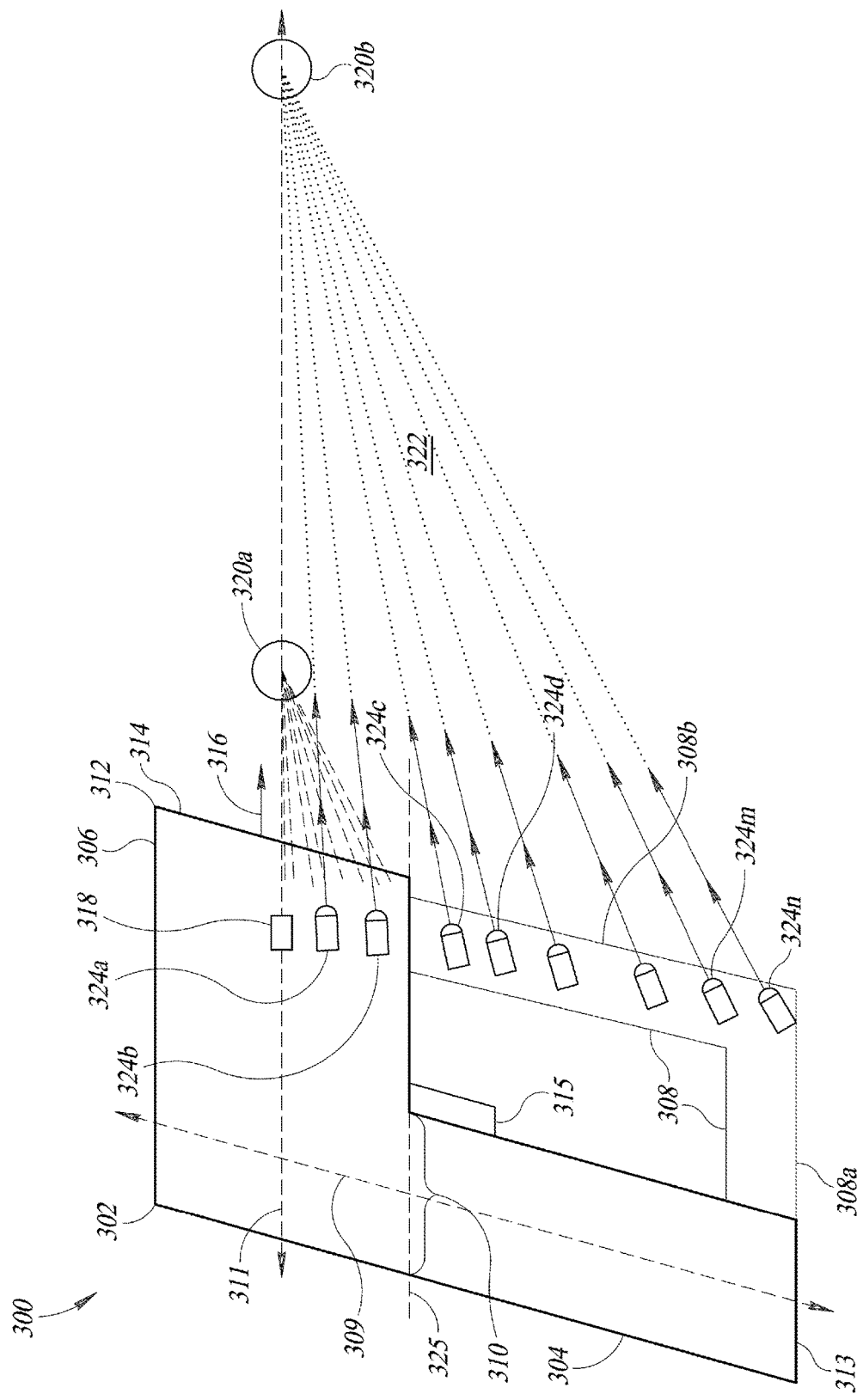
FIG. 3 is a schematic diagram of a machine-readable symbol reader having a plurality of light sources located in and below a head of the machine-readable symbol reader, for example in an L-shaped extension, to advantageously provide a wider angle of illumination, and shows an increase in distance between a nose of the machine readable symbol reader and an object achievable via the distribution of illumination, according to at least one illustrated embodiment.

FIG. 3 shows a machine-readable symbol reader 300, according to at least one of the inventive implementations described herein.

The machine-readable symbol reader 300 comprises a housing or body 302 that includes a handle 304, a head 306, and an extension, in particular an L-shaped extension 308. The handle 304 has a principal or major axis 309. The head 306 has a principal or major axis 311. The head 306 extends laterally forwardly at an angle from the handle 304 at a junction 310 between the handle and the head 306. A first portion 308a of the L-shaped extension 308 extends laterally from proximate a base 313 of the handle 304, parallel or approximately parallel with the principal or major axis 311 of the head 306. A second portion 308b of the L-shaped extension 308 extends laterally from proximate a front or nose 312 of the head 306, parallel or approximately parallel with the principal or major axis 309 of the handle 304. In profile, the handle 304, head 306, and L-shaped extension 308 may form a D-shape or a stylized D-shape.

The handle 304 is sized and dimensioned to be gripped by a human hand during use. The head can be any suitable shape. The machine-readable symbol reader 300 optionally includes a trigger 315. The trigger 315 may be attached to the body 302 proximate the junction 310 between the handle 304 and the head 306. The trigger 315 is positioned to be actuatable by a finger when a human hand grips the handle 304.

The head 306 includes a front or nose 312, and a window 314 located at the nose 312 and which faces a forward direction (indicated by arrow 316). The machine-readable symbol reader 300 includes a set of receiving optics and light sensor, collectively 318, located in the head 306. The receiving optics and light sensor 318 are positioned and oriented to receive illumination returned from objects 320a, 320b in an exterior environment 322 via the window 314. Object 320a represents an object at a maximum distance at which a machine-readable symbol can be successfully read using conventional machine-readable symbol readers. Object 320b represents an object at a maximum distance at which a machine-readable symbol can be successfully read using machine-readable symbol readers with illumination emitting from portions other than the head, or in addition to the head, of the machine-readable symbol reader, as taught herein.

The machine-readable symbol reader 300 includes a set of active illumination sources 324a, 324b, 324c, 324d . . . , 324m, 324n (eight shown, six called out, collectively or individually 324). The active illumination sources 324 are positioned and oriented to emit illumination in a forward direction from the machine-readable symbol reader 300 into the exterior environment 322 to illuminate objects 320a, 320b bearing machine-readable symbols. In contrast to conventional approaches, at least some of the active illumination sources 324c, 324d, . . . , 324m, 324n are advantageously arranged to emit light from below the head 306 of the machine-readable symbol reader 300. That is, at least some of the active illumination sources 324 are arranged to emit light from below a plane (illustrated by broken line 325) that passes through the junction 310 where the head 306 extends from the handle 304 and that does not intersect the major axis 311 of the head 306. Optionally, one or more of the active illumination sources 324a, 324b may be arranged to emit light from the head 306 of the machine-readable symbol reader 300. While FIG. 3 illustrates only two active illumination sources 324a, 324b oriented to emit light from the head 306, other implementations can include a greater number of active illumination sources oriented to emit light from the head 306, for example symmetrically arranged with respect to the receiving optics and light sensor 318. These would be in addition to the active illumination sources 324c, 324d, . . . , 324m, 324n are arranged to emit light from below the head 306 of the machine-readable symbol reader 300. In yet other implementations, there may be no active illumination sources arranged to emit light from the head 306 of the machine-readable symbol reader 300. As illustrated, the active illumination sources 324 may be oriented at various angles with respect to one another and/or with respect to the L-shaped extension 308 such that a respective principal axis of emission of each of the active illumination sources 324 intersects at a defined distance from the nose 312 of the machine-readable symbol reader 300. Illumination sources 324 can be distinct LEDs, and/or can be lensed or unlensed.

Figure 4:
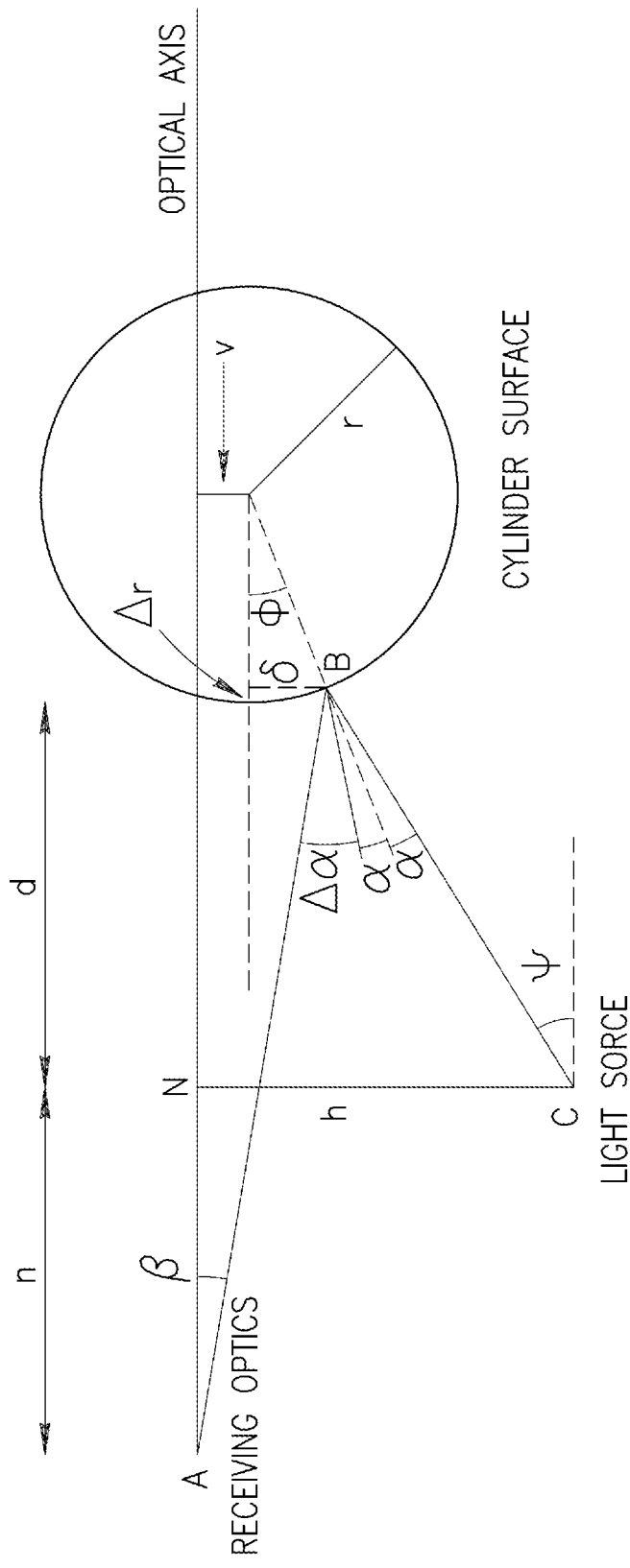
FIG. 4 is a schematic diagram showing various ray traces for illumination of a cylindrical object bearing a machine readable symbol by a machine-readable symbol reader that provides illumination from below a head of the machine-readable symbol reader, and for light returned from the cylindrical object bearing to the machine-readable symbol reader, according to at least one illustrated embodiment.

FIG. 4 schematically shows an orientation of receiving optics and/or sensor at a location A and an illumination source at a location C with respect to an illuminated portion at a location B on an object with a curved surface that bears a machine-readable symbol, according to one illustrated implementation. FIG. 4 diagrammatically represents how an optimized distribution of active or passive illumination or light sources or point sources of light can be determined, when an object includes a curved (e.g., cylindrical surface) placed in front of a main receiving optical system (e.g., receiving optics and light sensor). Such can even account for a lateral displacement between a center of the object (e.g., center of curvature) and an optical axis of a machine-readable symbol reader.

As illustrated, an active or passive illumination or light source at location C spaced below the head of a machine-readable symbol reader, for example emitting from an extension or a handle, causes an optical sensor to see an illumination stripe. The position of the illumination stripe depends on a distance h of the active or passive illumination or light source at location C from an optical axis of the receiving optics and/or sensor at location A, a distance (n+d) of the object from the machine-readable symbol reader (e.g., main optics entrance pupil), a distance v of a lateral displacement of a center of the cylinder from the optical axis of the optical system and a radius r of the curved surface of the object. The size of the stripe depends on the scattering properties of the curved surface of the object. If the curved surface of the object is perfectly reflective, the stripe will be extremely thin. If the curved surface of the object is Lambertian, the stripe will be as wide as the illuminated portion of the curved surface of the object that is in the field of view of the receiving optics and/or sensor at location A.

A goal of a design may be to use a minimum number of active or passive illumination or light sources at location C, and to position the active or passive illumination or light sources at location C so that the respective illumination stripes made by each active or passive illumination or light source at location C has a smallest overlap, without gaps, over a wide range of distance, range of radii and range of scattering properties required by or expected of a particular application or intended environment of use. In this way the curved surface of the object is illuminated uniformly, without gaps, and the DPM machine-readable symbol can successfully be read and decoded.

In determining the design, the model may be limited to a "vertical" plane containing the optical axis and the handle (along the line segment NC), and assume that a principal or major axis (e.g., longitudinal axis) of the curved (e.g., cylindrical) surface is normal to the "vertical" plane. For the purpose of the design exercise, these limits and assumptions are sufficiently representative of full three dimensional (3D) behavior.

An active or passive illumination or light source positioned at location C as illustrated in FIG. 4 emits light over the angle range $[\psi_{min}, \psi_{max}]$. This range of angles has to be sufficiently wide as to provide illumination of the surface of the object over the required range of distances. As illustrated in FIG. 4, a ray BC illuminates a portion at location B of the curved surface, and is scattered back to the receiving optics and/or sensor at location A (e.g., main optics entrance pupil). Due to the ray BC, the receiving optics and/or sensor A sensor or detect an illumination "hotspot" at location B on the curved surface of the object. Due to scattering, the receiving optics and/or sensor at location A receives rays that bounce back from the curved surface of the object with reflection angle $(\alpha+\Delta\alpha)$, which is different from an incidence angle $\alpha$. Therefore, for each active or passive illumination or light source at a location C, there exists more than one location B that scatters light back to the receiving optics and/or sensor at location A. Because of the finite extent of scattered ray angles, there is a finite stripe of "points or locations B" that scatter rays back to the receiving optics and/or sensor at location A, which is seen by the receiving optics and/or sensor at location A as an illumination stripe over the curved surface of the object.

Figure 5A:
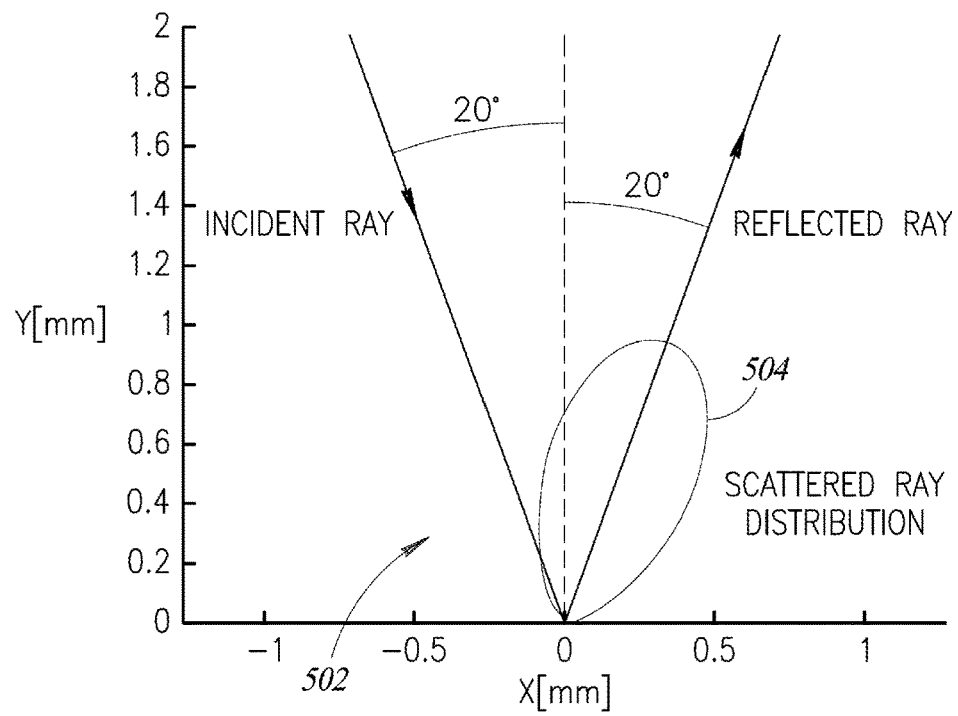
FIG. 5A is a graph showing a plot of incidence angle and reflected ray angle for a planar scattering surface and a distribution or scattered rays.

FIG. 5A shows a plot 502 of incidence angle and reflected ray angle for a planar scattering surface and a distribution or scattered rays.

The scattering model discussed in reference to FIG. 4 is a general one. FIG. 5A shows an example of planar scattering surface at y=0. The incidence ray is mirror-reflected, and also generates a set of scattered rays, the intensity and direction of which is represented by the elliptical line 504.

Figure 5B:
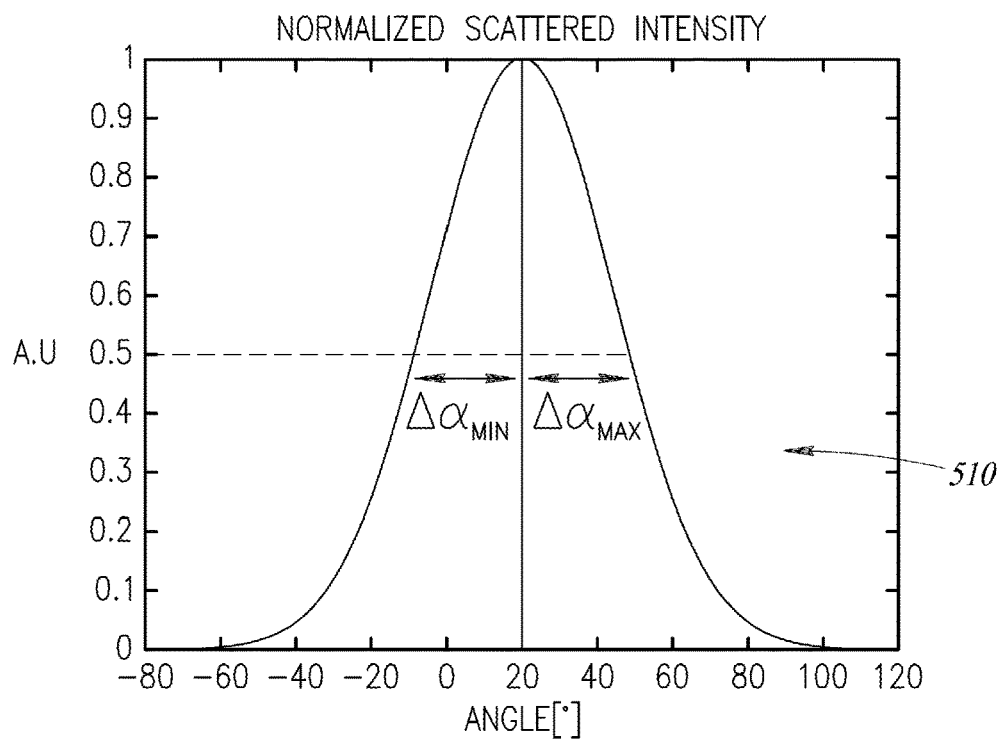
FIG. 5B is a graph showing a plot of normalized scattered light intensity as a function of angle.

FIG. 5B shows a plot 510 of normalized scattered light intensity as a function of angle.

In particular, FIG. 5B shows the scattered light intensity as a function of the angle. The curve 510 is centered at 20°, which is the angle of mirror reflection. The value $\Delta\alpha$ is the deviation from the mirror reflection condition. For $\Delta\alpha=0$, the ray under analysis is the mirror reflection one. The range of scattered ray angles can be considered to extend from $\Delta\alpha_{min}$ to $\Delta\alpha_{max}$, centered on reflection angle $\alpha$. In practice, $\Delta\alpha_{min}$ and $\Delta\alpha_{max}$ is found as the $\Delta\alpha$ at which the scattered intensity I is half of that at $\Delta\alpha=0$, as set out by the following relationship:

$$I(\alpha+\Delta\alpha_{min})=I(\alpha+\Delta\alpha_{max})=0.5$$

A simplifying assumption is that $\Delta\alpha_{min}=-\Delta\alpha_{max}$, which does not depend on the incidence angle nor on the point on the scattering surface.

The goal of the analysis is to find the relation that describes the extent of the illumination stripe for a given geometry and surface scattering properties. By inverting the above relation, with a given illumination stripe, it is possible to design the optimal position of the active or passive illumination or light sources C.

Considering the geometry represented in FIG. 4, the following relations hold:

$$r\sin\phi = \delta. \quad \text{Eq. 1}$$

$$\Delta r = r(1 - \cos\phi). \quad \text{Eq. 2}$$

$$2\alpha = \beta = 2\phi + \beta. \quad \text{Eq. 3}$$

$$\tan\beta = \frac{\delta + v}{n + d + \Delta r} = \frac{\sin\phi + \frac{v}{r}}{\frac{n+d}{r} + (1 - \cos\phi)}. \quad \text{Eq. 4}$$

$$h = v + \delta + \tan(2\alpha + \Delta\alpha - \beta)(d + \Delta r) = \quad \text{Eq. 5}$$
$$v + \delta + \tan(2\phi - \Delta\alpha + \beta)[d + r(1 - \cos\phi)].$$

$$\frac{h}{r} - \frac{v}{r} - \sin\phi - \left[\frac{d}{r} + (1 - \cos\phi)\right]\tan \quad \text{Eq. 6}$$
$$\left\{2\phi + \operatorname{atan}\left[\frac{\sin\phi + \frac{v}{r}}{\frac{n+d}{r} + (1 - \cos\phi)}\right] - \Delta\alpha\right\} = 0.$$

For a given $\Delta\alpha$ and a given geometry (i.e., given d, h, r, n, v), the illuminating ray angle $\phi$ is found solving equation 6.

The extent of the illumination stripe is found considering the extremes of the scattering angles, which means that considering $\Delta\alpha=\Delta\alpha_{min}$ equation 6 yields $\phi_{min}$ and $\Delta\alpha=\Delta\alpha_{max}$ it yields $\phi_{max}$.

Figure 6:
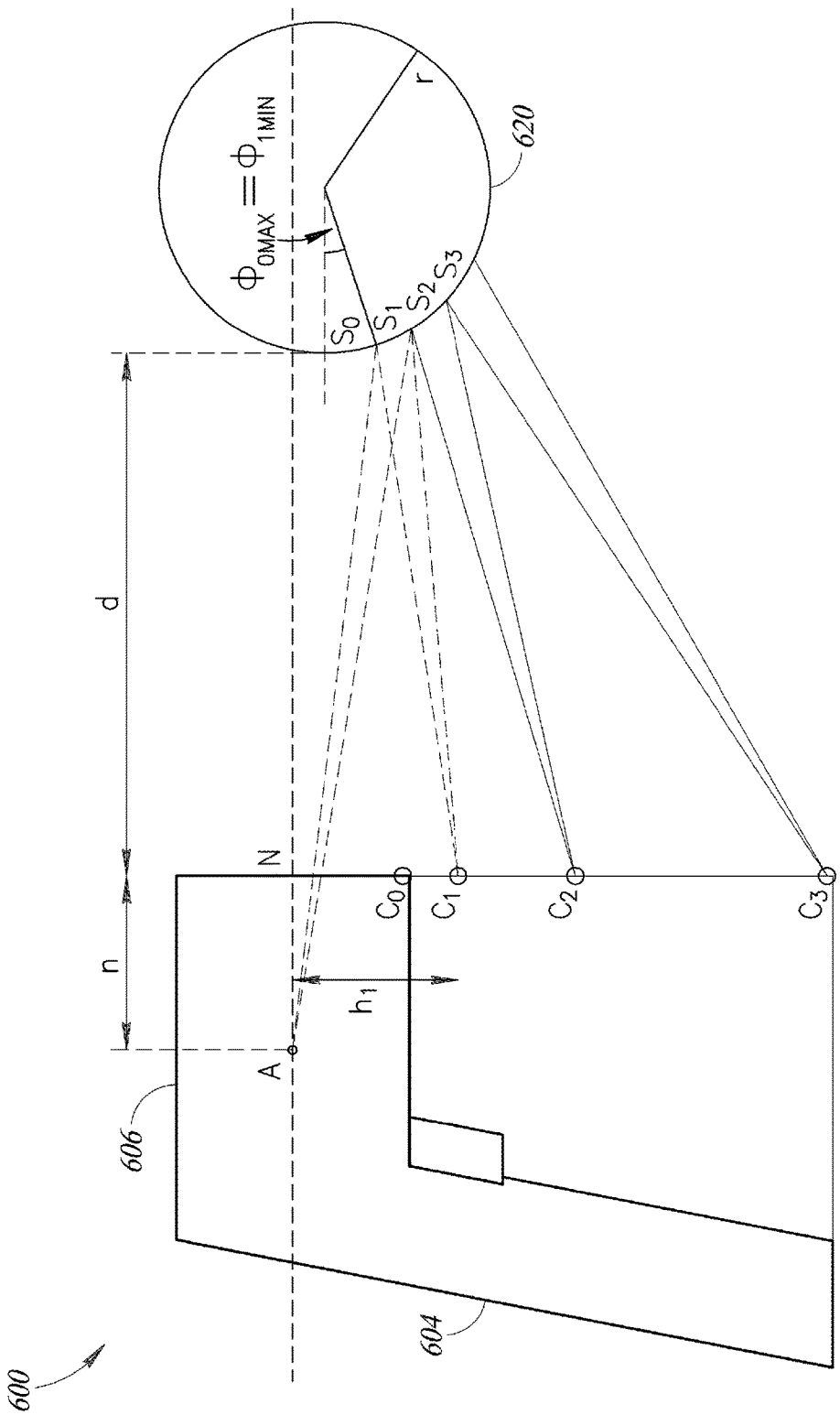
FIG. 6 is a schematic diagram showing ray traces representing illumination from one of a number of points located at and below a head of a machine-readable symbol reader and ray traces of light returned from a curved surface of a cylindrical object, according to at least one illustrated embodiment.

FIG. 6 shows a distribution of four active or passive illumination sources at locations $C_0$, $C_1$, $C_2$, $C_3$, respectively, arranged to emit light from at and from below a head 606 of a machine-readable symbol reader 600 to illuminate an object 620. An algorithm to determine an optimal position for a sequence of point sources is described with respect to FIG. 6. The head 606 extends forwardly of a handle 604 of a machine-readable symbol reader 600.

Primary or main receiving optics and/or sensor at location A are positioned in the head 606 of a machine-readable symbol reader 600. A first active or passive illumination source or point source of light at location $C_0$ emits light from the head 606 and is farthest of the active or passive illumination source or point source of light in the head from an optical axis of receiving optics and/or sensor A. The first active or passive illumination source or point source of light at location $C_0$ creates a first illumination stripe at location $S_0$ on the curved (e.g., cylinder) surface of the object 620. The first illumination stripe at location $S_0$ extends from an angle $\phi_{0min}$ to an angle $\phi_{0max}$, which angles can be determined from equation 6 above, using $\Delta\alpha_{min}$ and $\Delta\alpha_{max}$ respectively.

A second active or passive illumination source or point source of light at location $C_1$ emits light from a portion that is not the head of the machine-readable symbol reader 600. The second active or passive illumination source or point source of light at location $C_1$ creates a second stripe at location $S_1$ that is contiguous to the first stripe at location $S_0$. Consequently, the distance $h_1$ between the second active or passive illumination source or point source of light at location $C_1$ and the optical axis can be found from equation 6, using $\phi_{0max}$ and $\Delta\alpha_{min}$.

Then the maximum stripe angle $\phi_{1max}$ of the first stripe at location $S_1$ can be found using the values for $h_1$ and $\Delta\alpha_{max}$.

This process is repeated for the third active or passive illumination source or point source of light at location $C_2$ and subsequent active or passive illumination source or point sources of light until a final active or passive illumination source or point source of light at location $C_n$ is reached for which $h_m$ covers the entire available length (e.g., $D_2$ of FIG. 2).

A machine-readable symbol reader 600 may have to illuminate curved surfaces (e.g., cylinders) at a variety of distances. For any given machine-readable symbol reader 600, the illumination stripes at locations $S_0 \ldots S_m$ reduce their overlap when the distance d between the machine-readable symbol reader 600 and the object becomes smaller. Therefore, it may be advantageous to design the light source distribution for the shorter distance of the distance working range $d_{min}$.

At the maximum distance $d_{max}$, the maximum stripe angle $\phi_{m\ max}$ [A1] of the last stripe at location $S_m$ is smallest.

The machine-readable symbol reader illuminates cylinders at various "vertical" positions, v, that is positions laterally displaced from the optical axis, for example along a vertical axis. For any given system, the illumination stripes $S_0 \ldots S_m$ reduce their amount of overlap when v increases. Therefore, the light source distribution should be made at the lowest position of the cylinder (largest positive value of v) that keeps the cylinder sufficiently within the field of view of the reader at the minimum working distance $d_{min}$.

A machine-readable symbol reader 600 may have to illuminate curved surfaces (e.g., cylinders) of a variety of radii. For any given machine-readable symbol reader 600, the illumination stripes at locations $S_0 \ldots S_m$ reduce their overlap as the radius r of the curved surface becomes larger. Therefore, it may be advantageous to design the light source distribution for the largest value of the radius working range $r_{max}$.

A machine-readable symbol reader 600 may have to illuminate curved surfaces (e.g., cylinders) with various amounts of scattering $\Delta\alpha_{max}$. For any given machine-readable symbol reader 600, the illumination stripes at locations $S_0 \ldots S_m$ reduce their overlap when $\Delta\alpha_{max}$ becomes smaller (i.e., the surface becoming increasingly mirror-like). Therefore, it may be advantageous to design the light source distribution for the smallest value $\Delta\alpha_{max}$ that is chosen or expected for the specific application or environment.

Table 1 shows the optimal light source positioning for the geometry given by: r=50 mm, d=20 mm, v=15 mm, n=50 mm, $h_0$=10 mm; $\Delta\alpha_{max}$=5°.

TABLE 1

| Point | h [mm] | $\phi_{max}$ (°) | $\delta_{max}$ [mm] |
|---|---|---|---|
| $C_0$ | 10.0 | −4.1 | −3.6 |
| $C_1$ | 13.5 | −2.2 | −1.9 |
| $C_2$ | 17.1 | −0.2 | −0.2 |
| $C_3$ | 20.7 | 1.8 | 1.5 |
| $C_4$ | 24.5 | 3.8 | 3.3 |

TABLE 1-continued

| Point | h [mm] | $\phi_{max}$ (°) | $\delta_{max}$ [mm] |
|---|---|---|---|
| $C_5$ | 28.7 | 5.9 | 5.1 |
| $C_6$ | 33.2 | 8.1 | 7.0 |
| $C_7$ | 38.4 | 10.4 | 9.0 |
| $C_8$ | 44.5 | 12.9 | 11.1 |
| $C_9$ | 52.3 | 15.5 | 13.4 |
| $C_{10}$ | 62.8 | 18.4 | 15.8 |

Uniformity of illumination is ensured for d>20 mm. Light sources placed in the locations $C_0 \ldots C_{10}$ that emit rays at least in the range [−90°, 0] (i.e., from the direction of CN up to a direction parallel to the optical axis) guarantee illumination of the curved surface over a distance range from d=20 to d approaching infinity.

Figure 7:
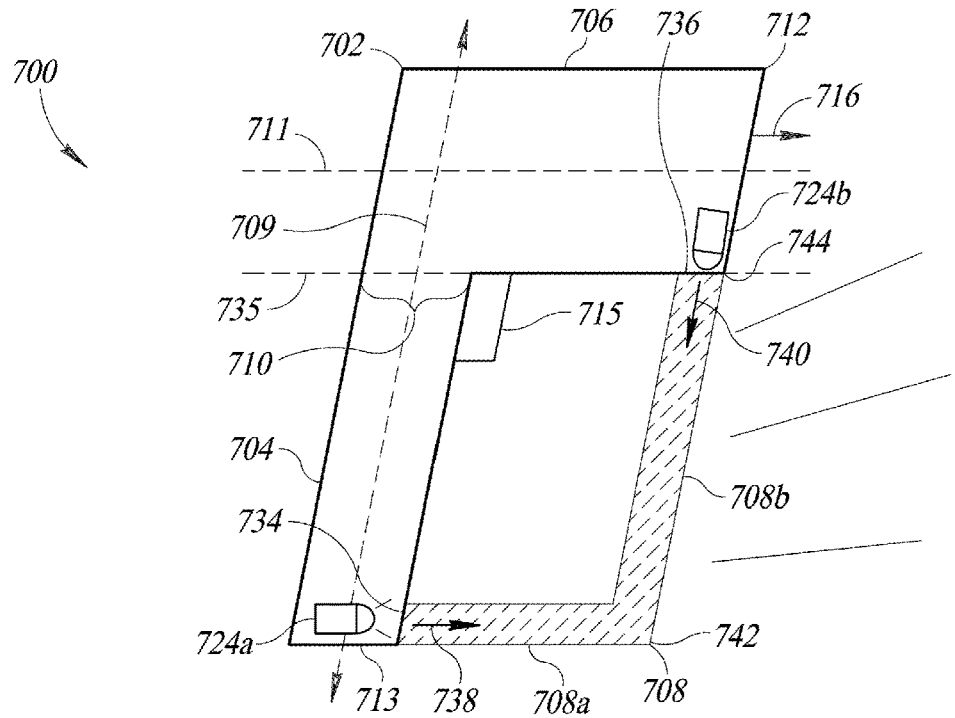
FIG. 7 is a schematic diagram showing a machine-readable symbol reader with an L-shaped extension and two active light or illumination sources, one positioned in a head and another positioned in a handle of the machine-readable symbol reader, which provides illumination along an entire distance between a first location on the extension and a second location on the extension, both the first and the second locations located relatively below the head of the machine-readable symbol reader, according to at least one illustrated embodiment.

FIG. 7 shows a machine readable symbol reader 700, according to another illustrated implementation.

The machine readable symbol reader 700 has many of the same structures as the machine readable symbol reader 300 described above, and except for specific differences described herein, the machine readable symbol reader 700 can include any combination of the structures of the machine readable symbol reader 100, 300 described above, including a housing 702 similar to the housing 302 and a field of view similar to field of view 316. Similar, or even identical, structures are identified by reference numbers that share the same last two digits as the reference numbers used in FIG. 3, and only significant differences are described below.

The machine-readable symbol reader 700 comprises a housing or body 702 that includes a handle 704, a head 706, and an extension, in particular an L-shaped extension 708. The head 706 extends laterally forwardly at a non-zero angle from the handle 704 at a junction 710 between the handle and the head 706. A first portion 708a of the L-shaped extension 708 extends laterally from proximate a base 713 of the handle 704, parallel or approximately parallel with the principal or major axis 711 of the head 706. A second portion 708b of the L-shaped extension 708 extends laterally from proximate the front or nose 712 of the head 706, for instance parallel or approximately parallel with the principal or major axis 709 of the handle 704. In profile, the handle 704, head 706, and L-shaped extension 708 may form a D-shape or stylized D-shape.

In contrast to the implementation of FIG. 3, the L-shaped extension 708 illustrated in FIG. 7 is transmissive of light, for example comprising a light pipe or a waveguide.

The machine-readable symbol reader 700 includes a first active illumination source 724a and a second active illumination source 724b, collectively or individually 724. In contrast to the implementation of FIG. 3, the first active illumination source 724a illustrated in FIG. 7 can be located in the handle 704, for instance at or proximate the base thereof, positioned and oriented to pass light into a first end 734 of the L-shaped extension 708. Also in contrast to the implementation of FIG. 3, the second active illumination source 724b illustrated in FIG. 7 can be located in the head 706, positioned and oriented to pass light directly or indirectly into a second end 736 of the L-shaped extension 708. Thus, first active illumination source 724a passes light into first end 734 of the L-shaped extension 708 in a first direction indicated by arrow 738 along a first portion 708a of the L-shaped extension 708 that extends parallel or approximately parallel with the head 706. The second active illumination source 724b passes light directly or indirectly into second end 736 of the L-shaped extension 708 in a second direction indicated by arrow 740 along a second portion 708b of the L-shaped extension 708 that extends parallel or approximately parallel with the handle 704. Where the L-shaped extension 708 is a waveguide, the first and second active illumination sources 724a, 724b may be positioned and oriented to pass light into the respective first and second ends 734, 736 at desired or defined angles (e.g., light entering at angles greater than a defined critical angle for the materials), for example to achieve total internal reflection or propagation of light along the L-shaped extension 708 via total internal reflection.

At least part of a front facing portion of the second portion 708b of the L-shaped extension 708 is transmissive, allowing at least some light to transmit into the exterior environment in a forward direction, indicated by arrow 716, along an entire distance between a first location 742 on the extension and a second location 744 on the extension, the second location 744 spaced from the first location 742 (transmissive portion denominated herein and in the claims as light emission portion of the body). As illustrated in FIG. 7, the first location 742 can be at or proximate an elbow or joint of the L-shaped extension 708 and the second location 744 can be at or proximate the front or nose 712 of the head 706. In some implementations, a portion of cladding, if any, may be removed from the front facing portion or light emission portion of the second portion 708b of the L-shaped extension 708. In other implementations, an angle of insertion or entrance of the light at the first or second ends 734, 736 can be such to ensure that while some of the light propagates by total internal reflection, some of light exits as the light propagates along the front facing portion or light emission portion of the second portion 708b of the L-shaped extension 708. In yet other implementations, the second portion 708b of the L-shaped extension 708 may include refractive or reflective elements or components to cause at least some light to project outwardly in a forward direction.

In contrast to conventional approaches, light advantageously emits from below the head 706 of the machine-readable symbol reader 700. That is, light emits from below a plane, represented by line 735, that passes through the junction 710 where the head 706 extends from the handle 704 and that does not intersect the major axis 711 of the head 706. Optionally, one or more of the active illumination sources (not shown in FIG. 7) may be arranged to emit light from the head 706 of the machine-readable symbol reader 700. While FIG. 7 illustrates only two active illumination sources 724a, 724b, other implementations can include a greater number of active illumination sources.

Figure 8:
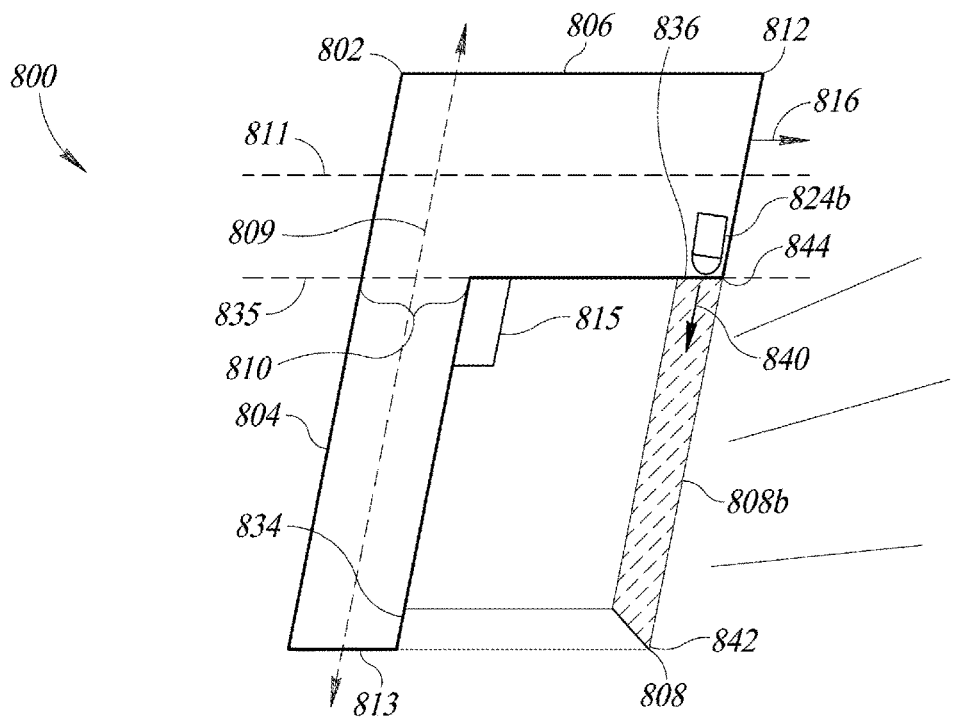
FIG. 8 is a schematic diagram showing a machine-readable symbol reader with an L-shaped extension and an active light or illumination source positioned in a head of the machine-readable symbol reader, which provides illumination along an entire distance between a first location on the extension and a second location on the extension, both the first and the second locations located relatively below the head of the machine-readable symbol reader, according to at least one illustrated embodiment.

FIG. 8 shows a machine readable symbol reader 800, according to another illustrated implementation.

The machine readable symbol reader 800 has many of the same structures as the machine readable symbol reader 700 described above, and except for specific differences described herein, the machine readable symbol reader 800 can include any combination of the structures of the machine readable symbol reader 100, 300, 700 described above, including a housing 802 similar to the housing 302, 702. Similar, or even identical, structures are identified by reference numbers that share the same last two digits as the reference numbers used in FIGS. and 3 and 7, and only significant differences are described below.

The machine-readable symbol reader 800 comprises a housing or body 802 that includes a handle 804, a head 806, and an extension, in particular an L-shaped extension 808. The head 806 extends laterally forwardly at a non-zero angle from the handle 804 at a junction 810 between the handle and the head 806. A first portion 808a of the L-shaped extension 808 extends laterally from proximate a base 813 of the handle 804, parallel or approximately parallel with the principal or major axis 811 of the head 806. A second portion 808b of the L-shaped extension 808 extends laterally from proximate the front or nose 812 of the head 806, parallel or approximately parallel with the principal or major axis 809 of the handle 804. In profile, the handle 804, head 806, and L-shaped extension 808 may form a D-shape or stylized D-shape.

In contrast to the implementation of FIG. 3, the L-shaped extension 808 illustrated in FIG. 8 is transmissive of light, for example comprising a light pipe or a waveguide.

In contrast to the implementation of FIG. 7, the machine-readable symbol reader 800 includes only the second active illumination source 824b located in the head 806, positioned and oriented to pass light, directly or indirectly, into a second end 836 of the L-shaped extension 808. Thus, second active illumination source 824b passes light into second end 836 of the L-shaped extension 808 in a second direction indicated by arrow 840 along a second portion 808b of the L-shaped extension 808 that extends parallel or approximately parallel with the handle 804. Where the L-shaped extension 808 is a waveguide, the second active illumination source 824b may be positioned and oriented to pass light into the second end 836 at desired or defined angles (e.g., light entering at angles greater than a defined critical angle for the materials), for example to achieve total internal reflection or propagation of light along the L-shaped extension 808 via total internal reflection.

At least part of a front facing portion of the second portion 808b of the L-shaped extension 808 is transmissive, allowing at least some light to transmit into the exterior environment in a forward direction, indicated by arrow 816, along an entire distance between a first location 842 on the extension and a second location 844 on the extension, the second location 844 spaced from the first location 842 (transmissive portion denominated herein and in the claims as light emission portion of the body). As illustrated in FIG. 8, the first location 842 can be at or proximate an elbow or joint of the L-shaped extension 808 and the second location 844 can be at or proximate the front or nose 812 of the head 806. In some implementations, a portion of cladding, if any, may be removed from the front facing portion or light emission portion of the second portion 808b of the L-shaped extension 808. In other implementations, an angle of insertion or entrance of the light at the second end 836 can be such to ensure that while some of the light propagates by total internal reflection, some of light exits as the light propagates along the front facing portion or light emission portion of the second portion 808b of the L-shaped extension 808. In yet other implementations, the second portion 808b of the L-shaped extension 808 may include refractive or reflective elements or components to cause at least some light to project outwardly in a forward direction.

In contrast to conventional approaches, light advantageously emits from below the head 806 of the machine-readable symbol reader 800. That is, light emits from below a plane, represented by line 835, that passes through the junction 810 where the head 806 extends from the handle 804 and that does not intersect the major axis 811 of the head 806. Optionally, one or more of the illumination sources (not shown in FIG. 8) may be arranged to emit light from the head 806 of the machine-readable symbol reader 800. While FIG. 8 illustrates only one illumination source 824b, other implementations can include a greater number of illumination sources.

Figure 9:
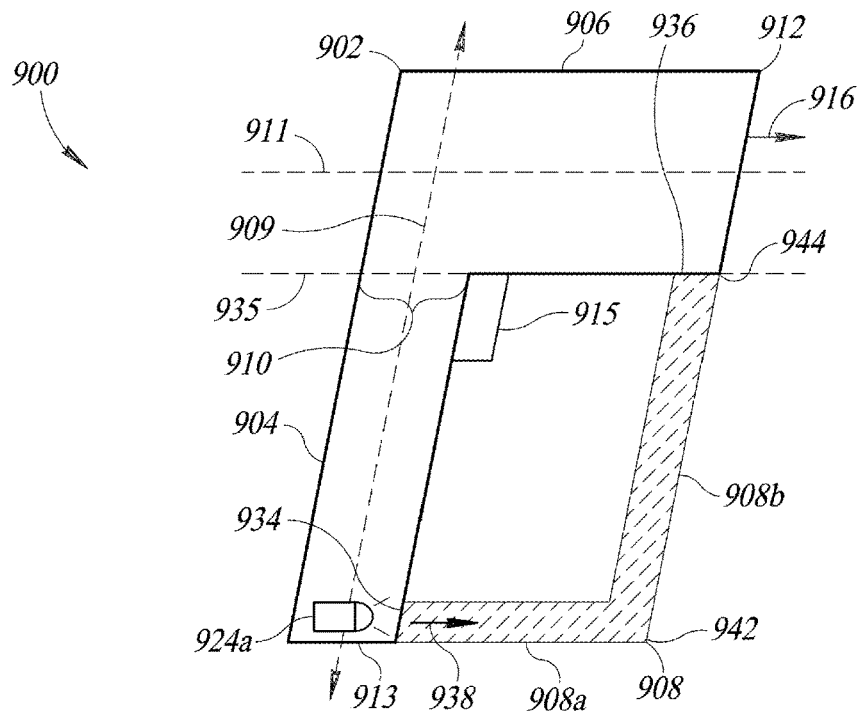
FIG. 9 is a schematic diagram showing a machine-readable symbol reader with an L-shaped extension and an active light or illumination source positioned in a handle of the machine-readable symbol reader, which provides illumination along an entire distance between a first location on the extension and a second location on the extension, both the first and the second locations located relatively below the head of the machine-readable symbol reader, according to at least one illustrated embodiment.

FIG. 9 shows a machine readable symbol reader 900, according to another illustrated implementation.

The machine readable symbol reader 900 has many of the same structures as the machine readable symbol reader 700 described above, and except for specific differences described herein, the machine readable symbol reader 900 can include any combination of the structures of the machine readable symbol readers 100, 300, 700 described above, including a housing 902 similar to the housing 302, 702. Similar, or even identical, structures are identified by reference numbers that share the same last two digits as the reference numbers used in FIGS. 3 and 7, and only significant differences are described below.

The machine-readable symbol reader 900 comprises a housing or body 902 that includes a handle 904, a head 906, and an extension, in particular an L-shaped extension 908. The head 906 extends laterally forwardly at a non-zero angle from the handle 904 at a junction 910 between the handle and the head 906. A first portion 908a of the L-shaped extension 908 extends laterally from proximate a base 913 of the handle 904, parallel or approximately parallel with the principal or major axis 911 of the head 906. A second portion 908b of the L-shaped extension 908 extends laterally from proximate the front or nose 912 of the head 906, parallel or approximately parallel with the principal or major axis 909 of the handle 904. In profile, the handle 904, head 906, and L-shaped extension 908 may form a D-shape or stylized D-shape.

In contrast to the implementation of FIG. 7, the machine-readable symbol reader 900 includes only a first active illumination source 924a, the first active illumination source 924a located in the handle 904, for instance at or proximate the base thereof, positioned and oriented to pass light into a first end 934 of the L-shaped extension 908. Thus, first active illumination source 924a passes light, directly or indirectly, into first end 934 of the L-shaped extension 908 in a first direction indicated by arrow 938 along a first portion 908a of the L-shaped extension 908 that extends parallel or approximately parallel with the head 906. Where the L-shaped extension 908 is a waveguide, the first active illumination source 924a may be positioned and oriented to pass light into the first end 934 at desired or defined angles (e.g., light entering at angles greater than a defined critical angle for the materials), for example to achieve total internal reflection or propagation of light along the L-shaped extension 908 via total internal reflection.

At least part of a front facing portion of the second portion 908b of the L-shaped extension 908 is transmissive, allowing at least some light to transmit into the exterior environment in a forward direction, indicated by arrow 916, along an entire distance between a first location 942 on the L-shaped extension 908 and a second location 944 on the L-shaped extension 908, the second location 944 spaced from the first location 942 (transmissive portion denominated herein and in the claims as light emission portion of the body). As illustrated in FIG. 9, the first location 942 can be at or proximate an elbow or joint of the L-shaped extension 908 and the second location 944 can be at or proximate the front or nose 912 of the head 906. In some implementations, a portion of cladding, if any, may be removed from the front facing portion or light emission portion of the second portion 908b of the L-shaped extension 908. In other implementations, an angle of insertion or entrance of the light at the first end 934 can be such to ensure that while some of the light propagates by total internal reflection, some of light exits as the light propagates along the front facing portion or light emission portion of the second portion 908b of the L-shaped extension 908. In yet other implementations, the second portion 908b of the L-shaped extension 908 may include refractive or reflective elements or components to cause at least some light to project outwardly in a forward direction.

In contrast to conventional approaches, light advantageously emits from below the head 906 of the machine-readable symbol reader 900. That is, light emits from below a plane, represented by line 935, that passes through the junction 910 where the head 906 extends from the handle 904 and that does not intersect the major axis 911 of the head 906. Optionally, one or more of the active illumination sources (not shown in FIG. 9) may be arranged to emit light from the head 906 of the machine-readable symbol reader 900. While FIG. 9 illustrates only one active illumination source 924a, other implementations can include a greater number of active illumination sources.

Figure 10:
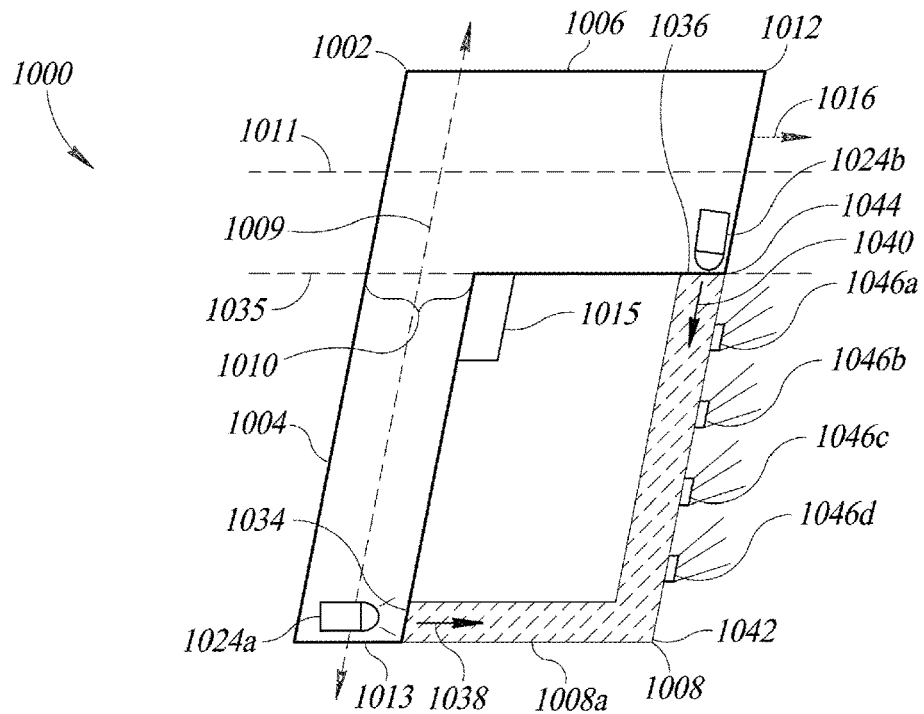
FIG. 10 is a schematic diagram showing a machine-readable symbol reader with an L-shaped extension and two active light or illumination sources, one positioned in a head and another positioned in a handle of the machine-readable symbol reader, which provides illumination as a plurality of point sources of light distributed along a portion of the extension which is located relatively below the head of the machine-readable symbol reader, according to at least one illustrated embodiment.

FIG. 10 shows a machine readable symbol reader 1000, according to another illustrated implementation.

The machine readable symbol reader 1000 has many of the same structures as the machine readable symbol reader 700 described above, and except for specific differences described herein, the machine readable symbol reader 1000 can include any combination of the structures of the machine readable symbol reader 100, 300, 700 described above, including a housing 1002 similar to the housing 302, 700 and a field of view similar to field of view 316. Similar, or even identical, structures are identified by reference numbers that share the same last two digits as the reference numbers used in FIGS. 3 and 7.

The machine-readable symbol reader 1000 comprises a housing or body 1002 that includes a handle 1004, a head 1006, and an extension, in particular an L-shaped extension 1008. The head 1006 extends laterally forwardly at an angle from the handle 1004 at a junction 1010 between the handle and the head 1006. A first portion 1008a of the L-shaped extension 1008 extends laterally from proximate a base 1013 of the handle 1004, parallel or approximately parallel with the principal or major axis 1011 of the head 1006. A second portion 1008b of the L-shaped extension 1008 extends laterally from proximate the front or nose 1012 of the head 1006, parallel or approximately parallel with the principal or major axis 1009 of the handle 1004. In profile, the handle 1004, head 1006, and L-shaped extension 1008 may form a D-shape or stylized D-shape.

Similar to the implementation of FIG. 7, the L-shaped extension 1008 illustrated in FIG. 10 is transmissive of light, for example comprising a light pipe or a waveguide.

The machine-readable symbol reader 1000 includes a first active illumination source 1024a and a second active illumination source 1024b, collectively or individually 1024. Similar to the implementation of FIG. 7, the first active illumination source 1024a illustrated in FIG. 10 can be located in the handle 1004, for instance at or proximate the base thereof, positioned and oriented to pass light into a first end 1034 of the L-shaped extension 1008. Also similar to the implementation of FIG. 7, the second active illumination source 1024b illustrated in FIG. 10 can be located in the head 1006, positioned and oriented to pass light into a second end 1036 of the L-shaped extension 1008. Thus, first active illumination source 1024a passes light into first end 1034 of the L-shaped extension 1008 in a first direction indicated by arrow 1038 along a first portion 1008a of the L-shaped extension 1008 that extends parallel or approximately parallel with the head 1006. The second active illumination source 1024b passes light into second end 1036 of the L-shaped extension 1008 in a second direction indicated by arrow 1040 along a second portion 1008b of the L-shaped extension 1008 that extends parallel or approximately parallel with the handle 1004. Where the L-shaped extension 1008 is a waveguide, the first and second active illumination sources 1024a, 1024b may be positioned and oriented to pass light, directly or indirectly, into the respective first and second ends 1034, 1036 at desired or defined angles (e.g., light entering at angles greater than a defined critical angle for the materials), for example to achieve total internal reflection or propagation of light along the L-shaped extension 1008 via total internal reflection.

At least part of a front facing portion of the second portion 1008b of the L-shaped extension 1008 is transmissive, allowing at least some light to transmit into the exterior environment in a forward direction, indicated by arrow 1016, as distinct point sources of light 1046a, 1046b, 1046c, 1046d (four shown, collectively and individually 1046) distributed between a first location 1042 on the extension and a second location 1044 on the extension, the second location 1044 spaced from the first location 1042 (transmissive portion denominated herein and in the claims as light emission portion of the body). As illustrated in FIG. 10, the first location 1042 can be at or proximate an elbow or joint of the L-shaped extension 1008 and the second location 1044 can be at or proximate the front or nose 1012 of the head 1006. In some implementations, distinct portions of cladding, if any, may be removed from a plurality of locations on the front facing portion or light emission portion of the second portion 1008b of the L-shaped extension 1008. In other implementations, the second portion 1008b of the L-shaped extension 1008 may include refractive or reflective elements or components spaced at distinct positions therealong to interfere with the propagation of light (e.g., propagation by total internal reflection) to cause at least some light to project outwardly in a forward direction as distinct point sources of light 1046. Since the point sources 1046 are simply passing light generated by the active illumination sources 1024a, 1024b, in some instances those illumination sources that actually generate the light are denominated as active illumination or light sources, while the distinct point sources of light 1046 that simply pass but do not generate light are in some instances denominated as passive point sources of illumination or light. It is noted that the total number of passive point sources of light 1046 can exceed the total number of active illumination sources 1024.

In contrast to conventional approaches, light advantageously emits from below the head 1006 of the machine-readable symbol reader 1000. That is, light emits from below a plane, represented by line 1035, that passes through the junction 1010 where the head 1006 extends from the handle 1004 and that does not intersect the major axis 1011 of the head 1006. Optionally, one or more of the active illumination sources (not shown in FIG. 10) may be arranged to emit light from the head 1006 of the machine-readable symbol reader 1000. While FIG. 10 illustrates only two illumination sources 1024a, 1024b, other implementations can include a greater number of illumination sources.

Figure 11:
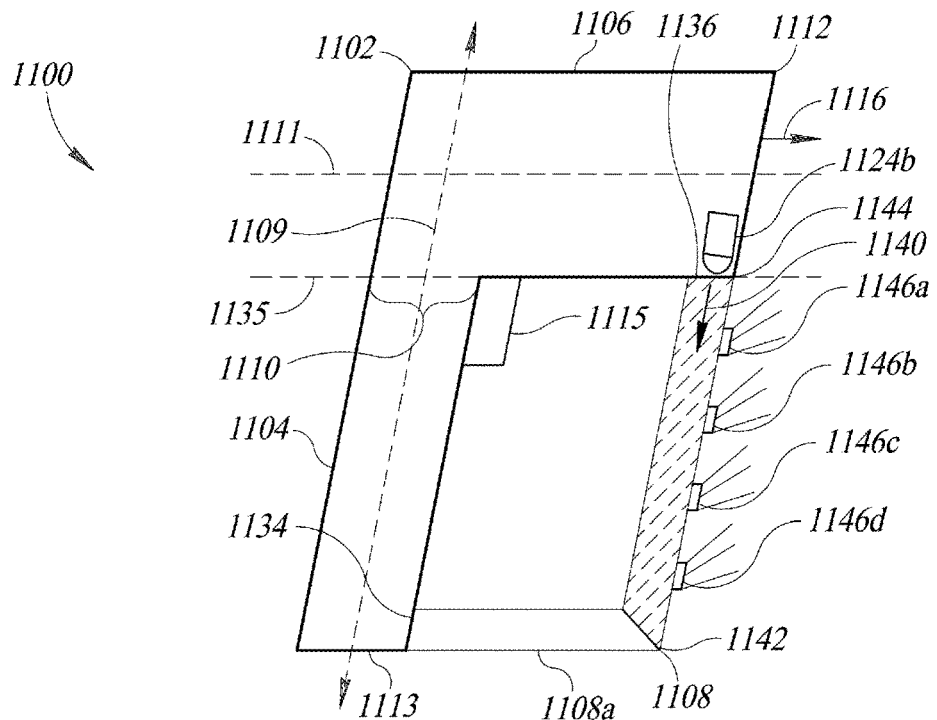
FIG. 11 is a schematic diagram showing a machine-readable symbol reader with an L-shaped extension and an active light or illumination source positioned in a head of the machine-readable symbol reader, which provides illumination as a plurality of point sources of light distributed along a portion of the extension which is located relatively below the head of the machine-readable symbol reader, according to at least one illustrated embodiment.

FIG. 11 shows a machine readable symbol reader 1100, according to another illustrated implementation.

The machine readable symbol reader 1100 has many of the same structures as the machine readable symbol reader 1000 described above, and except for specific differences described herein, the machine readable symbol reader 1100 can include any combination of the structures of the machine readable symbol reader 100, 300, 1000 described above, including a housing 1102 similar to the housing 302, 1002. Similar, or even identical, structures are identified by reference numbers that share the same last two digits as the reference numbers used in FIGS. 3 and 10.

The machine-readable symbol reader 1100 comprises a housing or body 1102 that includes a handle 1104, a head 1106, and an extension, in particular an L-shaped extension 1108. The head 1106 extends laterally forwardly at a non-zero angle from the handle 1104 at a junction 1110 between the handle and the head 1106. A first portion 1108a of the L-shaped extension 1108 extends laterally from proximate a base 1113 of the handle 1104, parallel or approximately parallel with the principal or major axis 1111 of the head 1106. A second portion 1108b of the L-shaped extension 1108 extends laterally from proximate the front or nose 1112 of the head 1106, parallel or approximately parallel with the principal or major axis 1109 of the handle 1104. In profile, the handle 1104, head 1106, and L-shaped extension 1108 may form a D-shape or stylized D-shape.

Similar to the implementation of FIG. 10, the L-shaped extension 1108 illustrated in FIG. 11 is transmissive of light, for example comprising a light pipe or a waveguide.

In contrast to the implementation of FIG. 10, the machine-readable symbol reader 1100 includes only the second active illumination source 1124b located in the head 1106, positioned and oriented to pass light into a second end 1136 of the L-shaped extension 1108. Thus, second active illumination source 1124b passes light, directly or indirectly, into second end 1136 of the L-shaped extension 1108 in a second direction indicated by arrow 1140 along a second portion 1108b of the L-shaped extension 1108 that extends parallel or approximately parallel with the handle 1104. Where the L-shaped extension 1108 is a waveguide, the second active illumination source 1124b may be positioned and oriented to pass light into the second end 1136 at desired or defined angles (e.g., light entering at angles greater than a defined critical angle for the materials), for example to achieve total internal reflection or propagation of light along the L-shaped extension 1108 via total internal reflection.

At least part of a front facing portion of the second portion 1108b of the L-shaped extension 1108 is transmissive, allowing at least some light to transmit into the exterior environment in a forward direction, indicated by arrow 1116, as distinct point sources of light 1146a, 1146b, 1146c, 1146d (four shown, collectively and individually 1146) distributed between a first location 1142 on the extension and a second location 1144 on the extension, the second location 1144 spaced from the first location 1142 (transmissive portion denominated herein and in the claims as light emission portion of the body). As illustrated in FIG. 11, the first location 1142 can be at or proximate an elbow or joint of the L-shaped extension 1108 and the second location 1144 can be at or proximate the front or nose 1112 of the head 1106. In some implementations, distinct portions of cladding, if any, may be removed from a plurality of locations on the front facing portion or light emission portion of the second portion 1108b of the L-shaped extension 1108. In other implementations, the second portion 1108b of the L-shaped extension 1108 may include refractive or reflective elements or components spaced at distinct positions therealong to interfere with the propagation of light (e.g., propagation by total internal reflection) to cause at least some light to project outwardly in a forward direction as distinct point sources of light 1146. Since the point sources 1146 are simply passing light generated by the active illumination sources 1124, in some instances the illumination sources that actually generate the light are denominated as active illumination or light sources, while the point sources 1146 that simply pass but do not generate light are in some instances denominated as passive point sources of illumination or light 1146. It is noted that the total number of passive point sources 1146 can exceed the total number of active illumination sources 1124.

In contrast to conventional approaches, light advantageously emits from below the head 1106 of the machine-readable symbol reader 1100. That is, light emits from below a plane, represented by line 1135, that passes through the junction 1110 where the head 1106 extends from the handle 1104 and that does not intersect the major axis 1111 of the head 1106. Optionally, one or more of the active illumination sources (not shown in FIG. 11) may be arranged to emit light from the head 1106 of the machine-readable symbol reader 1100. While FIG. 11 illustrates only one active illumination source 1124b, other implementations can include a greater number of active illumination sources.

Figure 12:
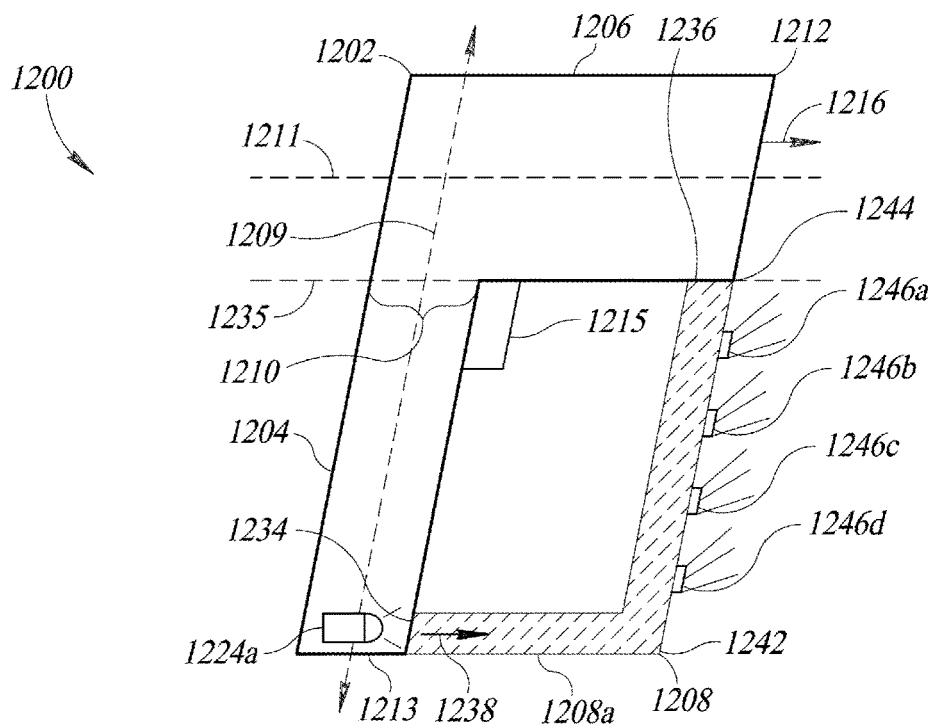
FIG. 12 is a schematic diagram showing a machine-readable symbol reader with an L-shaped extension and an active light or illumination source positioned in a handle of the machine-readable symbol reader, which provides illumination as a plurality of point sources distributed along a portion of the extension which is located relatively below the head of the machine-readable symbol reader, according to at least one illustrated embodiment.

FIG. 12 shows a machine readable symbol reader 1200, according to another illustrated implementation.

The machine readable symbol reader 1200 has many of the same structures as the machine readable symbol reader 900 described above, and except for specific differences described herein, the machine readable symbol reader 1200 can include any combination of the structures of the machine readable symbol readers 100, 300, 900 described above, including a housing 1202 similar to the housing 302, 902. Similar, or even identical, structures are identified by reference numbers that share the same last two digits as the reference numbers used in FIGS. 3 and 9.

The machine-readable symbol reader 1200 comprises a housing or body 1202 that includes a handle 1204, a head 1206, and an extension, in particular an L-shaped extension 1208. The head 1206 extends laterally forwardly at a non-zero angle from the handle 1204 at a junction 1210 between the handle and the head 1206. A first portion 1208a of the L-shaped extension 1208 extends laterally from proximate a base 1213 of the handle 1204, parallel or approximately parallel with the principal or major axis 1211 of the head 1206. A second portion 1208b of the L-shaped extension 1208 extends laterally from proximate the front or nose 1212 of the head 1206, parallel or approximately parallel with the principal or major axis 1209 of the handle 1204. In profile, the handle 1204, head 1206, and L-shaped extension 1208 may form a D-shape or stylized D-shape.

In contrast to the implementation of FIG. 10, the machine-readable symbol reader 1200 includes only a first active illumination source 1224a, the first active illumination source 1224a located in the handle 1204, for instance at or proximate the base thereof, positioned and oriented to pass light into a first end 1234 of the L-shaped extension 1208. Thus, first active illumination source 1224a passes light, directly or indirectly, into first end 1234 of the L-shaped extension 1208 in a first direction indicated by arrow 1238 along a first portion 1208a of the L-shaped extension 1208 that extends parallel or approximately parallel with the head 1206. Where the L-shaped extension 1208 is a waveguide, the first active illumination source 1224a may be positioned and oriented to pass light into the first end 1234 at desired or defined angles (e.g., light entering at angles greater than a defined critical angle for the materials), for example to achieve total internal reflection or propagation of light along the L-shaped extension 1208 via total internal reflection.

At least part of a front facing portion of the second portion 1208b of the L-shaped extension 1208 is transmissive, allowing at least some light to transmit into the exterior environment in a forward direction, indicated by arrow 1216, as distinct point sources of light 1246a, 1246b, 1246c, 1246d (four shown, collectively and individually 1246) distributed at distinct locations between a first location 1242 on the extension and a second location 1244 on the extension, the second location 1244 spaced from the first location 1242 (transmissive portion denominated herein and in the claims as light emission portion of the body). As illustrated in FIG. 12, the first location 1242 can be at or proximate an elbow or joint of the L-shaped extension 1208 and the second location 1244 can be at or proximate the front or nose 1212 of the head 1206. In some implementations, distinct portions of cladding, if any, may be removed from a plurality of locations on the front facing portion or light emission portion of the second portion 1208b of the L-shaped extension 1208. In other implementations, the second portion 1208b of the L-shaped extension 1208 may include refractive or reflective elements or components spaced at distinct positions therealong to interfere with the propagation of light (e.g., propagation by total internal reflection) to cause at least some light to project outwardly in a forward direction as distinct point sources of light 1246. Since the point sources 1246 are simply passing light generated by the illumination sources, in some instances the illumination sources 1224 that actually generate the light are denominated as active illumination or light sources 1224, while the distinct point sources 1246 that simply pass but do not generate light are in some instances denominated as passive point sources of illumination or light 1246. It is noted that the total number of passive point sources 1246 can exceed the total number of active illumination sources 1224.

In contrast to conventional approaches, light advantageously emits from below the head 1206 of the machine-readable symbol reader 1200. That is, light emits from below a plane, represented by line 1235, that passes through the junction 1210 where the head 1206 extends from the handle 1204 and that does not intersect the major axis 1211 of the head 1206. Optionally, one or more of the active illumination sources (not shown in FIG. 12) may be arranged to emit light from the head 1206 of the machine-readable symbol reader 1200. While FIG. 12 illustrates only one active illumination source 1224a, other implementations can include a greater number of active illumination sources.

Figure 13:
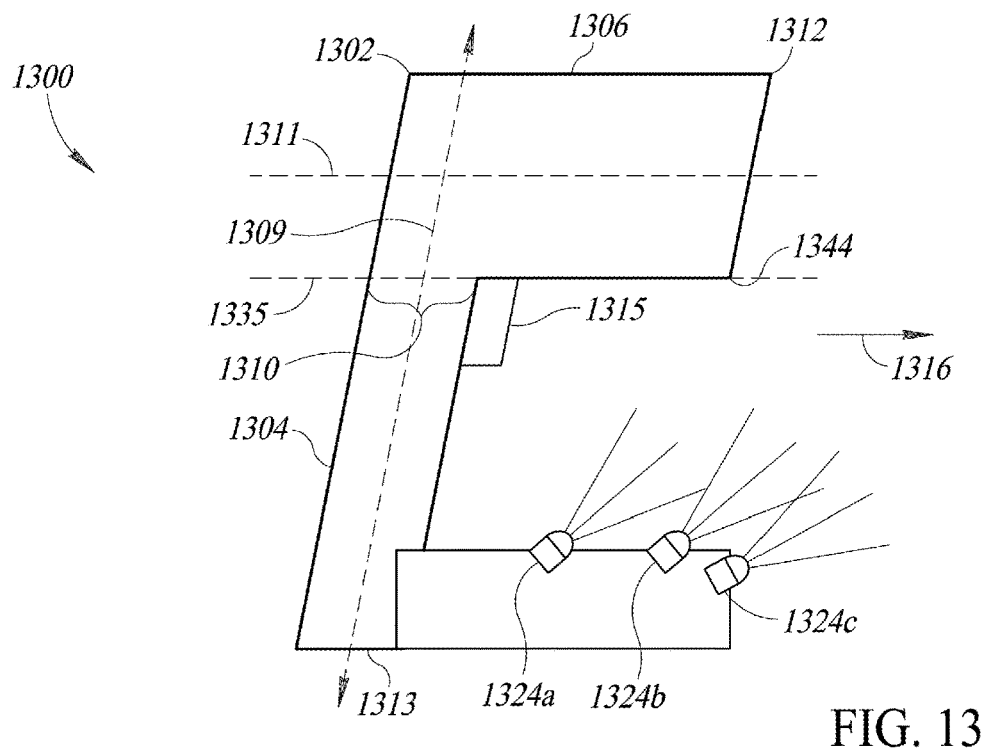
FIG. 13 is a schematic diagram showing a machine-readable symbol reader with an elongated extension that extends from a base of a handle of the machine-readable symbol reader and a number of active light or illumination sources positioned on or in the elongated extension, which provide illumination as a plurality of point sources of light distributed along a portion of the extension, which is located relatively below the head of the machine-readable symbol reader, according to at least one illustrated embodiment.

FIG. 13 shows a machine-readable symbol reader 1300, according to at least one of the inventive implementations described herein.

The machine readable symbol reader 1300 has many of the same structures as the machine readable symbol reader 300 described above, and except for specific differences described herein, the machine readable symbol reader 1300 can include any combination of the structures of the machine readable symbol readers 100, 300 described above, including a housing 1302 similar to the housing 302. Similar, or even identical, structures are identified by reference numbers that share the same last two digits as the reference numbers used in FIG. 3.

The machine-readable symbol reader 1300 comprises a housing or body 1302 that includes a handle 1304, a head 1306, and an extension, in particular an elongated extension 1308. The handle 1304 has a principal or major axis 1309. The head 1306 has a principal or major axis 1311. The head 1306 extends laterally forwardly at a non-zero angle from the handle 1304 at a junction 1310 between the handle and the head 1306. The elongated extension 1308 extends laterally from proximate a base 1313 of the handle 1304, parallel or approximately parallel with the principal or major axis 1311 of the head 1306. In profile, the handle 1304, head 1306, and elongated extension 1308 may form a C-shape or stylized C-shape.

The handle 1304 is sized and dimensioned to be gripped by a human hand during use. The head can be any suitable shape. The machine-readable symbol reader 1300 optionally includes a trigger 1315. The trigger 1315 may be attached to the body 1302 proximate the junction 1310 between the handle 1304 and the head 1306. The trigger 1315 is positioned to be actuatable by a finger when a human hand grips the handle 1304.

The head 1306 includes a front or nose 1312, and a window 1314 located at the nose 1312 and which faces a forward direction (indicated by arrow 1316). The machine-readable symbol reader 1300 includes a set of receiving optics and light sensor, collectively 1318, located in the head 1306. The receiving optics and light sensor 1318 are positioned and oriented to receive illumination returned from objects 1320 in an exterior environment 1322 via the window 1314.

The machine-readable symbol reader 1300 includes a set of active illumination sources 1324a, 1324b, 1324c (three shown, collectively or individually 1324), located in or on the elongated extension 1308. The active illumination sources 1324 are positioned and oriented to emit illumination in a forward direction from the machine-readable symbol reader 1300 into the exterior environment 1322 to illuminate objects 1320 bearing machine-readable symbols. In contrast to conventional approaches, at least some of the active illumination sources 1324a, 1324b, 1324c are advantageously arranged to emit light from below the head 1306 of the machine-readable symbol reader 1300. That is, at least some of the active illumination sources 1324 are arranged to emit light from below a plane, represented by line 1335, that passes through the junction 1310 where the head 1306 extends from the handle 1304 and that does not intersect the major axis 1311 of the head 1306. Optionally, one or more of active illumination sources (not shown in FIG. 13) may be arranged to emit light from the head 1306 of the machine-readable symbol reader 1300. While FIG. 13 illustrates only three active illumination sources 1324a, 1324b, 1324c, other implementations can include a greater number of active illumination sources. As illustrated, the active illumination sources 1324 may be oriented at various angles with respect to one another and/or with respect to the elongated extension 1308 such that a respective principal axis of emission of each of the active illumination sources 1324 intersects at a defined distance from the nose 1312 of the machine-readable symbol reader 1300.

Figure 14:
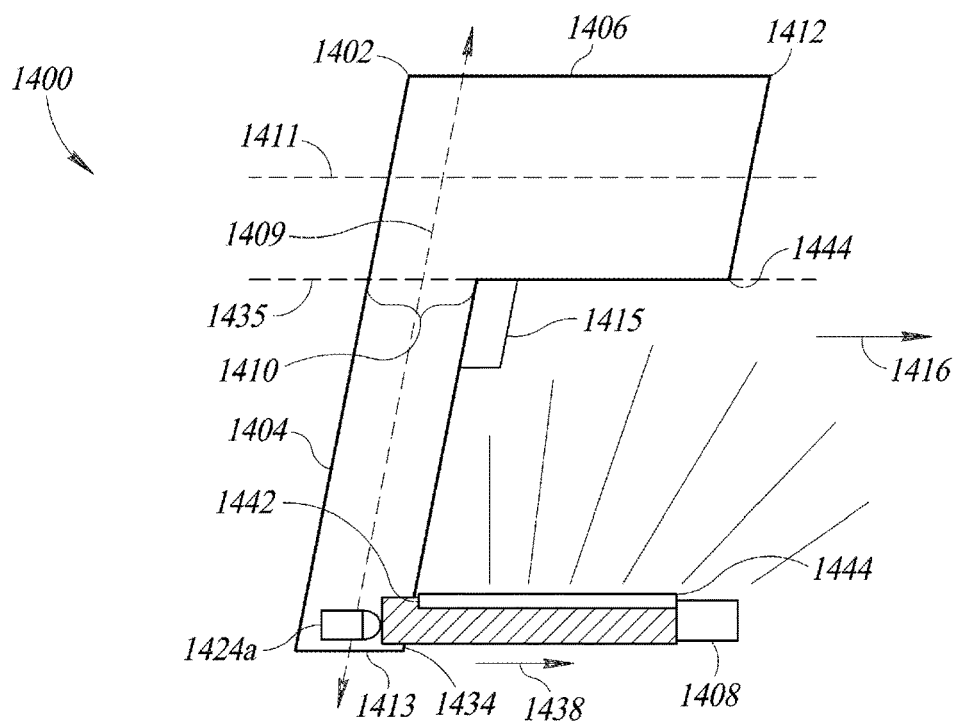
FIG. 14 is a schematic diagram showing a machine-readable symbol reader with an elongated extension that extends from a base of a handle of the machine-readable symbol reader and an active light or illumination source positioned in the handle, which provides illumination along an entire distance between a first location on the elongated extension and a second location on the extension, both the first and the second locations located relatively below the head of the machine-readable symbol reader, according to at least one illustrated embodiment.

FIG. 14 shows a machine-readable symbol reader 1400, according to at least one of the inventive implementations described herein.

The machine readable symbol reader 1400 has many of the same structures as the machine readable symbol reader 1300 described above, and except for specific differences described herein, the machine readable symbol reader 1400 can include any combination of the structures of the machine readable symbol readers 100, 300, 1300 described above, including a housing 1202 similar to the housing 302, 1302. Similar, or even identical, structures are identified by reference numbers that share the same last two digits as the reference numbers used in FIGS. 3 and 13.

The machine-readable symbol reader 1400 comprises a housing or body 1402 that includes a handle 1404, a head 1406, and an extension, in particular an elongated extension 1408. The handle 1404 has a principal or major axis 1409. The head 1406 has a principal or major axis 1411. The head 1406 extends laterally forwardly at a non-zero angle from the handle 1404 at a junction 1410 between the handle and the head 1406. The elongated extension 1408 extends laterally from proximate a base 1413 of the handle 1404, parallel or approximately parallel with the principal or major axis 1411 of the head 1406. In profile, the handle 1404, head 1406, and elongated extension 1408 may form a C-shape or stylized C-shape.

The handle 1404 is sized and dimensioned to be gripped by a human hand during use. The head can be any suitable shape. The machine-readable symbol reader 1400 optionally includes a trigger 1415. The trigger 1415 may be attached to the body 1402 proximate the junction 1410 between the handle 1404 and the head 1406. The trigger 1415 is positioned to be actuatable by a finger when a human hand grips the handle 1404.

The head 1406 includes a front or nose 1412, and a window 1414 located at the nose 1412 and which faces a forward direction (indicated by arrow 1416). The machine-readable symbol reader 1400 includes a set of receiving optics and light sensor (not shown in Figure) located in the head 1406. The receiving optics and light sensor 1418 are positioned and oriented to receive illumination returned from objects in an exterior environment via the window 1414.

In contrast to the implementation of FIG. 13, the machine-readable symbol reader 1400 includes only a first active illumination source 1424a, the first active illumination source 1424a located in the handle 1404, for instance at or proximate the base 1413 thereof, positioned and oriented to pass light, directly or indirectly, into a first end 1434 of the elongated extension 1408. Thus, first active illumination source 1424a passes light into first end 1434 of the elongated extension 1408 in a first direction indicated by arrow 1438 that extends parallel or approximately parallel with the head 1406. Where the elongated extension 1408 is a waveguide, the first active illumination source 1424a may be positioned and oriented to pass light into the first end 1434 at desired or defined angles (e.g., light entering at angles greater than a defined critical angle for the materials), for example to achieve total internal reflection or propagation of light along the elongated extension 1408 via total internal reflection.

At least part of the elongated extension 1408 is transmissive, allowing at least some light to transmit into the exterior environment in a forward direction, along an entire distance between a first location 1442 on the elongated extension 1408 and a second location 1444 on the elongated extension 1408, the second location 1444 spaced from the first location 1442 (transmissive portion denominated herein and in the claims as light emission portion of the body). As illustrated in FIG. 14, the first location 1442 can be at or proximate the base 1413 and the second location 1444 can be at or proximate an outermost end of the elongated extension 1408. In some implementations, a portion of cladding, if any, may be removed from the front facing portion or light emission portion of the second portion 1408b of the elongated extension 1408. In other implementations, an angle of insertion or entrance of the light at the first end 1434 can be such to ensure that while some of the light propagates by total internal reflection, some of light exits as the light propagates along the front facing portion or light emission portion of the second portion 1408b of the elongated extension 1408. In yet other implementations, the second portion 1408b of the elongated extension 1408 may include refractive or reflective elements or components to cause at least some light to project outwardly in a forward direction.

In contrast to conventional approaches, light advantageously emits from below the head 1406 of the machine-readable symbol reader 1400. That is, light emits from below a plane, represented by line 1435, that passes through the junction 1410 where the head 1406 extends from the handle 1404 and that does not intersect the major axis 1411 of the head 1406. Optionally, one or more of the active illumination sources (not shown in FIG. 14) may be arranged to emit light from the head 1406 of the machine-readable symbol reader 1400. While FIG. 14 illustrates only one active illumination source 1424, other implementations can include a greater number of active illumination sources.

Figure 15:
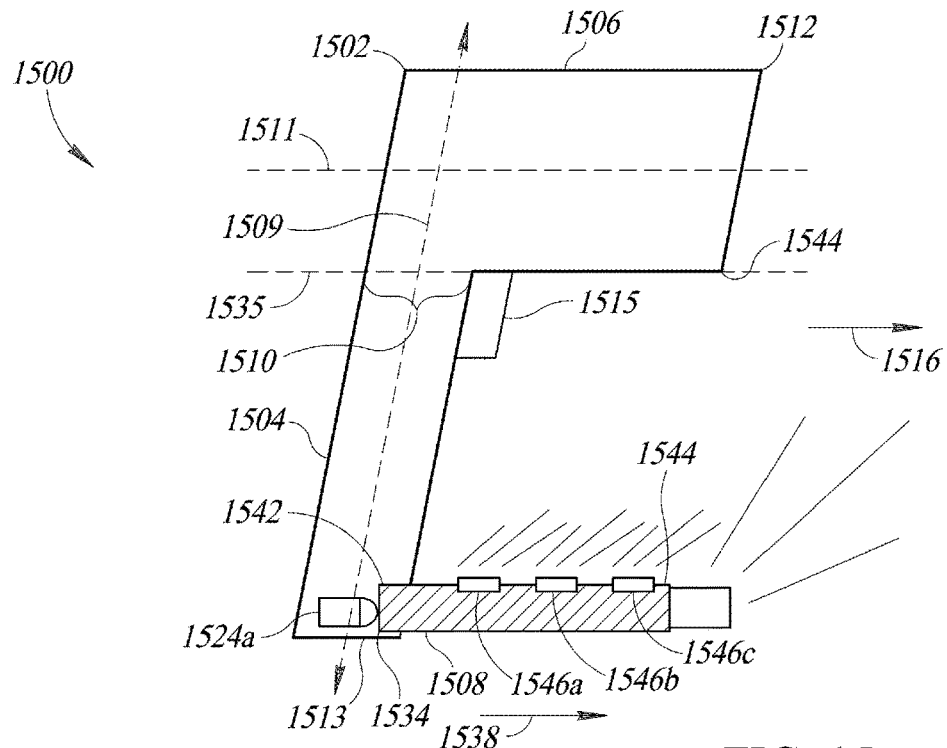
FIG. 15 is a schematic diagram showing a machine-readable symbol reader with an elongated extension that extends from a base of a handle of the machine-readable symbol reader and a light source positioned in the handle, which provides illumination as a plurality of point sources distributed along a portion of the elongated extension, which is located relatively below the head of the machine-readable symbol reader, according to at least one illustrated embodiment.

FIG. 15 shows a machine-readable symbol reader 1500, according to at least one of the inventive implementations described herein.

The machine readable symbol reader 1500 has many of the same structures as the machine readable symbol reader 1400 described above, and except for specific differences described herein, the machine readable symbol reader 1500 can include any combination of the structures of the machine readable symbol readers 100, 300, 1300, 1400 described above, including a housing 1202 similar to the housing 302, 1302, 1402. Similar, or even identical, structures are identified by reference numbers that share the same last two digits as the reference numbers used in FIGS. 3, 13 and 14.

The machine-readable symbol reader 1500 comprises a housing or body 1502 that includes a handle 1504, a head 1506, and an extension, in particular an elongated extension 1508. The handle 1504 has a principal or major axis 1509. The head 1506 has a principal or major axis 1511. The head 1506 extends laterally forwardly at a non-zero angle from the handle 1504 at a junction 1510 between the handle and the head 1506. The elongated extension 1508 extends laterally from proximate a base 1513 of the handle 1504, parallel or approximately parallel with the principal or major axis 1511 of the head 1506. In profile, the handle 1504, head 1506, and elongated extension 1508 may form a C-shape or stylized C-shape.

The handle 1504 is sized and dimensioned to be gripped by a human hand during use. The head can be any suitable shape. The machine-readable symbol reader 1500 optionally includes a trigger 1515. The trigger 1515 may be attached to the body 1502 proximate the junction 1510 between the handle 1504 and the head 1506. The trigger 1515 is positioned to be actuatable by a finger when a human hand grips the handle 1504.

The head 1506 includes a front or nose 1512, and a window 1514 located at the nose 1512 and which faces a forward direction (indicated by arrow 1516). The machine-readable symbol reader 1500 includes a set of receiving optics and light sensor, collectively 1518, located in the head 1506. The receiving optics and light sensor 1518 are positioned and oriented to receive illumination returned from objects 1520 in an exterior environment 1522 via the window 1514.

In contrast to the implementation of FIG. 13, the machine-readable symbol reader 1500 includes only a first active illumination source 1524, the first active illumination source 1524 located in the handle 1504, for instance at or proximate the base 1513 thereof, positioned and oriented to pass light, directly or indirectly, into a first end 1534 of the elongated extension 1508. Thus, first active illumination source 1524 passes light into first end 1534 of the elongated extension 1508 in a first direction indicated by arrow 1538 that extends parallel or approximately parallel with the head 1506. Where the elongated extension 1508 is a waveguide, the first active illumination source 1524 may be positioned and oriented to pass light into the first end 1534 at desired or defined angles (e.g., light entering at angles greater than a defined critical angle for the materials), for example to achieve total internal reflection or propagation of light along the elongated extension 1508 via total internal reflection.

At least part of the elongated extension 1508 is transmissive, allowing at least some light to transmit into the exterior environment in a forward direction, as distinct point sources of light 1546a, 1546b, 1546c (three shown, collectively and individually 1546) distributed between a first location 1542 on the elongated extension 1508 and a second location 1544 on the elongated extension 1508, the second location 1544 spaced from the first location 1542 (transmissive portion denominated herein and in the claims as light emission portion of the body). As illustrated in FIG. 15, the first location 1542 can be at or proximate the base 1513 and the second location 1544 can be at or proximate an outermost end of the elongated extension 1508. In some implementations, distinct portions of cladding, if any, may be removed from a plurality of locations on the front facing portion or light emission portion of the second portion 1508b of the elongated extension 1508. In other implementations, the second portion 1508b of the elongated extension 1508 may include refractive or reflective elements or components spaced at distinct positions therealong to interfere with the propagation of light (e.g., propagation by total internal reflection) to cause at least some light to project outwardly in a forward direction as distinct point sources of light 1546. Since the point sources 1546 are simply passing light generated by the illumination sources 1524, in some instances the illumination sources 1524 that actually generate the light are denominated as active illumination or light sources 1524, while the distinct point sources 1546 that simply pass but do not generate light are in some instances denominated as passive point sources of illumination or light 1546. It is noted that the total number of passive point sources 1546 can exceed the total number of active illumination sources 1524.

In contrast to conventional approaches, light advantageously emits from below the head 1506 of the machine-readable symbol reader 1500. That is, light emits from below a plane, represented by line 1535, that passes through the junction 1510 where the head 1506 extends from the handle 1504 and that does not intersect the major axis 1511 of the head 1506. Optionally, one or more of the active illumination sources (not shown in FIG. 15) may be arranged to emit light from the head 1506 of the machine-readable symbol reader 1500. While FIG. 15 illustrates only one active illumination source 1524, other implementations can include a greater number of active illumination sources.

Figure 16:
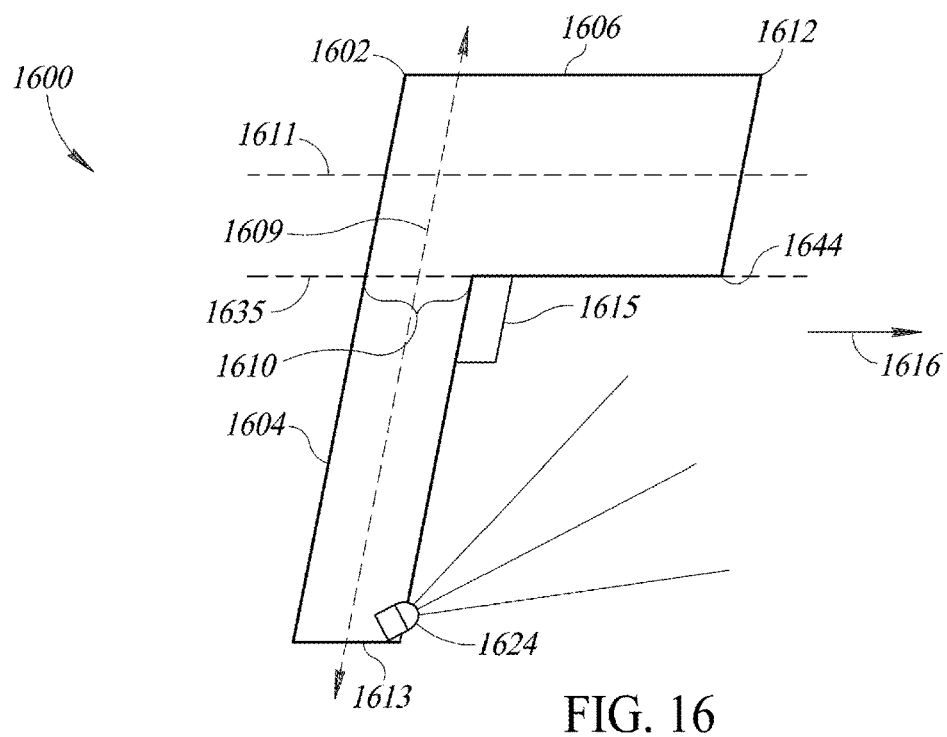
FIG. 16 is a schematic diagram showing a machine-readable symbol reader with a light source positioned in a base of a handle, which provides illumination from a location which is located relatively below the head of the machine-readable symbol reader, according to at least one illustrated embodiment.

FIG. 16 shows a machine-readable symbol reader 1600, according to at least one of the inventive implementations described herein.

The machine readable symbol reader 1600 has many of the same structures as the machine readable symbol reader 300 described above, and except for specific differences described herein, the machine readable symbol reader 1600 can include any combination of the structures of the machine readable symbol reader 100, 300 described above, including a housing 1602 similar to the housing 302. Similar, or even identical, structures are identified by reference numbers that share the same last two digits as the reference numbers used in FIG. 3.

The machine-readable symbol reader 1600 comprises a housing or body 1602 that includes a handle 1604 and a head 1606, but in contrast to the previously described implementations, omits an extension. The handle 1604 has a principal or major axis 1609. The head 1606 has a principal or major axis 1611. The head 1606 extends laterally forwardly at a non-zero angle from the handle 1604 at a junction 1610 between the handle and the head 1606. In profile, the handle

1604, head 1606, and elongated extension 1608 may form an L-shape or a stylized L-shape or pistol shape.

The handle 1604 is sized and dimensioned to be gripped by a human hand during use. The head can be any suitable shape. The machine-readable symbol reader 1600 optionally includes a trigger 1615. The trigger 1615 may be attached to the body 1602 proximate the junction 1610 between the handle 1604 and the head 1606. The trigger 1615 is positioned to be actuatable by a finger when a human hand grips the handle 1604.

The head 1606 includes a front or nose 1612, and a window 1614 located at the nose 1612 and which faces a forward direction (indicated by arrow 1616). The machine-readable symbol reader 1600 includes a set of receiving optics and light sensor, collectively 1618, located in the head 1606. The receiving optics and light sensor 1618 are positioned and oriented to receive illumination returned from objects 1620 in an exterior environment 1622 via the window 1614.

The machine-readable symbol reader 1600 an active illumination sources 1624 located in or on the handle 1404, for example at or proximate a base 1613 thereof. The active illumination source 1624 is positioned and oriented to emit illumination in a forward direction from the machine-readable symbol reader 1600 into the exterior environment 1622 to illuminate objects 1620 bearing machine-readable symbols. In contrast to conventional approaches, at least one active illumination source 1624 is advantageously arranged to emit light from below the head 1606 of the machine-readable symbol reader 1600. That is, at least one active illumination source 1624 is arranged to emit light from below a plane, represented by line 1635, that passes through the junction 1610 where the head 1606 extends from the handle 1604 and that does not intersect the major axis 1611 of the head 1606. Optionally, one or more of active illumination sources (not shown in FIG. 16) may be arranged to emit light from the head 1606 of the machine-readable symbol reader 1600. While FIG. 16 illustrates only one active illumination source 1624, other implementations can include a greater number of active illumination sources. As illustrated, the active illumination source 1624 may be oriented at an angle with respect to the handle 1604 and/or head 1606 such that a respective principal axis of emission of the active illumination source 1624 intersects the principal or major axis 1611 of the head 1606 at a defined distance from the nose 1612 of the machine-readable symbol reader 1600.

Figure 17:
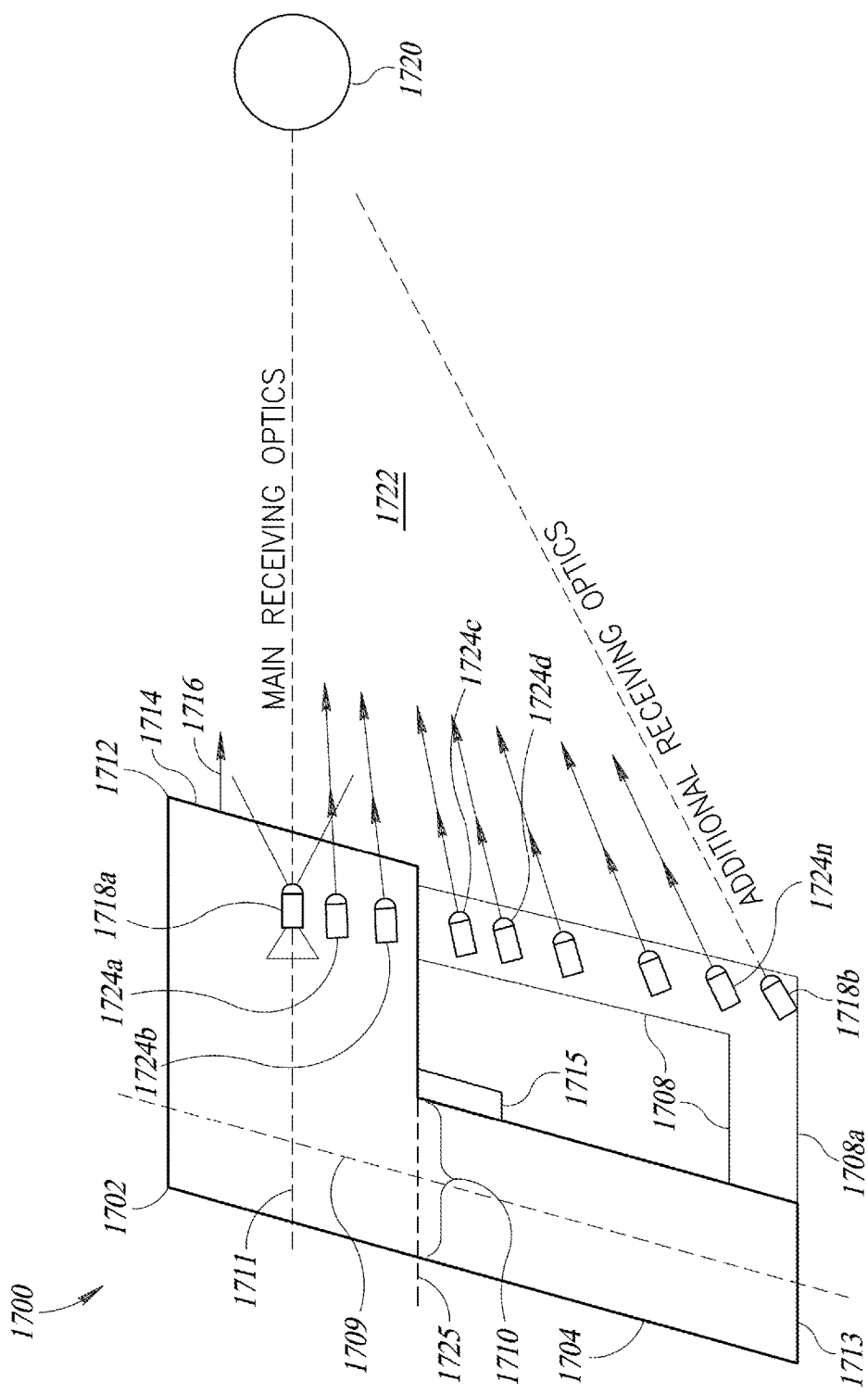
FIG. 17 is a schematic diagram of a machine-readable symbol reader an L-shaped extension, similar to that of the implementation of FIG. 3, and further including a second set of receiving optics positioned relatively below the head of the machine-readable symbol reader, according to at least one illustrated embodiment.

FIG. 17 shows a machine-readable symbol reader 1700, according to at least one of the inventive implementations described herein.

The machine readable symbol reader 1700 has many of the same structures as the machine readable symbol reader 300 described above, and except for specific differences described herein, the machine readable symbol reader 1700 can include any combination of the structures of the machine readable symbol readers 100, 300 described above, including a housing 1702 similar to the housing 302. Similar, or even identical, structures are identified by reference numbers that share the same last two digits as the reference numbers used in FIG. 3.

The machine-readable symbol reader 1700 comprises a housing or body 1702 that includes a handle 1704, a head 1706, and an extension, in particular an L-shaped extension 1708. The handle 1704 has a principal or major axis 1709. The head 1706 has a principal or major axis 1711. The head 1706 extends laterally forwardly at a non-zero angle from the handle 1704 at a junction 1710 between the handle and the head 1706. A portion of the L-shaped extension 1708 extends laterally from proximate a base 1713 of the handle 1704, parallel or approximately parallel with the principal or major axis 1711 of the head 1706. A portion of the L-shaped extension 1708 extends laterally from proximate the front or nose 1712 of the head 1706, parallel or approximately parallel with the principal or major axis 1709 of the handle 1704. In profile, the handle 1704, head 1706, and L-shaped extension 1708 may form a D-shape or stylized D-shape.

The handle 1704 is sized and dimensioned to be gripped by a human hand during use. The head can be any suitable shape. The machine-readable symbol reader 1700 optionally includes a trigger 1715. The trigger 1715 may be attached to the body 1702 proximate the junction 1710 between the handle 1704 and the head 1706. The trigger 1715 is positioned to be actuatable by a finger when a human hand grips the handle 1704.

The head 1706 includes a front or nose 1712, and a first window 1714a located at the nose 1712 and which faces a forward direction (indicated by arrow 1716). The machine-readable symbol reader 1700 includes a first set of receiving optics and light sensor, collectively 1718, located in the head 1706. The first set of receiving optics and light sensor 1718 are positioned and oriented to receive illumination returned from objects 1720 in an exterior environment 1722 via the first window 1714a. In contrast to previously described implementations, the machine-readable symbol reader 1700 includes a second set of receiving optics and light sensor, collectively 1718b, located in a portion other the head 1706, for example in the L-shaped extension 1708 as illustrated in FIG. 17, or alternatively in the handle 1704. The second set of receiving optics and light sensor 1718b are positioned and oriented to receive illumination returned from objects 1720 in an exterior environment 1722 via a second window 1714b. Addition of the second set of receiving optics and light sensor 1718b (i.e., second imaging system) to the extension or handle of the machine-readable symbol reader 1700 provides a further line of sight to the target (e.g., machinery-readable symbol) in addition to the line of sight provided by the first set of receiving optics and light sensor 1718a (i.e., first imaging system). Such can advantageously improve decoding and overall responsiveness (e.g., snappiness) of the machine-readable symbol reader 1700.

The machine-readable symbol reader 1700 optionally includes a set of active illumination sources 1724a, 1724b, 1724c, 1724d . . . , 1724m, 1724n (eight shown, collectively or individually 1724). The active illumination sources 1724 are positioned and oriented to emit illumination in a forward direction from the machine-readable symbol reader 1700 into the exterior environment 1722 to illuminate objects 1720 bearing machine-readable symbols. In contrast to conventional approaches, at least some of the active illumination sources 1724c, 1724d, . . . , 1724m, 1724n are advantageously arranged to emit light from below the head 1706 of the machine-readable symbol reader 1700. That is, at least some of the illumination sources 1724 are arranged to emit light from below a plane, represented by line 1735, that passes through the junction 1710 where the head 1706 extends from the handle 1704 and that does not intersect the major axis 1711 of the head 1706. Optionally, one or more of the active illumination sources 1724a, 1724b may be arranged to emit light from the head 1706 of the machine-readable symbol reader 1700. While FIG. 17 illustrates only two active illumination sources 1724a, 1724b oriented to emit light from the head 1706, other implementations can include a greater number of active illumination sources oriented to emit light from the head 1706, for example symmetrically arranged with respect to the receiving optics and light sensor 1718. These would be in addition to the active illumination sources 1724*c*, 1724*d*, . . . , 1724*m*, 1724*n* are arranged to emit light from below the head 1706 of the machine-readable symbol reader 1700. In yet other implementations, there may be no active illumination sources arranged to emit light from the head 1706 of the machine-readable symbol reader 1700.

The machine-readable symbol readers described herein can include any combination of the structures of the reader 100 described above. The machine-readable symbol readers can, for example, include a scan engine which include a sensor array such as sensor array 110, a focus element such as focus element 130, a lens system such as lens system 126, and optionally one or more illumination sources, such as active illumination source 120. Thus, the machine-readable symbol readers 300 can perform in the manner described above for reader 100, and can be operated to illuminate and read machine readable symbols within a scan aperture or field of view 316 (referring herein to a region that can be illuminated and/or scanned by the scan engine 308) that projects forward out of the front of the reader 300.

An operator can hold the machine-readable symbol reader, in a hand with an outstretched arm, so that the field of view projects outwardly from the front of the machine-readable symbol reader along an axis coincident with, parallel to, or substantially coincident with or parallel to a central longitudinal axis of the operator's forearm. As used herein, the axis along which a field of view projects is the center-most axis of the field of view. Thus, the machine-readable symbol reader can be used by the operator in a standard point-and-shoot manner such that these axes and planes are also coincident with, parallel to, or substantially coincident with or parallel to the operator's line of sight, in some cases perpendicular or substantially perpendicular to gravity.

Various embodiments of the apparatus, devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer-readable medium for use by or in connection with any computer and/or processor related system or method. In the context of this document, a memory is a computer-readable medium that is an electronic, magnetic, optical, or other another physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and transitory or transmission type media such as digital and analog communication links using TDM or IP based communication links (e.g., packet links).

Those of skill in the art will recognize that many of the methods or algorithms set out herein may employ additional acts, may omit some acts, and/or may execute acts in a different order than specified. The various embodiments described above can be combined to provide further embodiments. Aspects of the embodiments can be modified, if necessary, to employ additional systems, circuits and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A machine-readable symbol reader, comprising:
a body comprising:
 a handle having a base, a major axis and including a portion that extends along the major axis of the handle and that is sized and dimensioned to be gripped by a human hand during use of the machine-readable symbol reader; and a head extending laterally at least in a forward direction transverse from the major axis of the handle at a junction of the handle and the head, the head including a first window that faces in the forward direction and that provides a first return path for light returned from an exterior environment of the body of the machine-readable symbol reader, wherein the exterior environment comprises a machine-readable symbol located in a forward direction of the reader;

an extension having a first extension portion extending laterally from a front surface of the base of the handle in the forward direction, and a second extension portion extending vertically from the first extension portion to connect with the bottom surface of the head;

at least a first light sensor housed in the body and positioned in the first return path; and at least a first light source physically coupled to the body and configured to produce light outwardly from the body via at least a light emission portion of the second extension portion of the body positioned relatively below the junction where the head extends from the handle, wherein the light produced by at least the first light source emits from at least the light emission portion of the extension of the body outwardly from the body of the machine-readable symbol reader into the exterior environment; and at least a second light source located within a portion of the body other than the extension, wherein light produced by the at least second light source emits light in a forward direction from the head into the exterior environment and is returned to at least one light sensor located in the head via a second return path different than the first return path.

2. The machine-readable symbol reader of claim 1, further comprising:

a trigger attached to the body proximate the junction between the handle and the head, the trigger positioned to be actuatable by a finger when the human hand grips the handle, at least one of the first light source or the first light sensor response to actuation of the trigger to respectively emit light or sample light returned via the return path.

3. The machine-readable symbol reader of claim 1 wherein the extension is an L-shaped extension including the first extension portion and the second extension portion.

4. The machine-readable symbol reader of claim 3 wherein, in addition to the first light source, the machine-readable symbol reader includes a plurality of additional light sources, the first and the additional light sources distributed along the second extension portion and oriented to emit light forwardly outward from a front surface of the second extension portion.

5. The machine-readable symbol reader of claim 3 wherein the second extension portion includes a plurality of apertures that emit light as a plurality of light point sources distributed along the second extension portion and oriented to emit light forwardly outward from a front surface of the second extension portion.

6. The machine-readable symbol reader of claim 3 wherein the first extension portion and the second extension portion meet at a 90 degree angle.

7. The machine-readable symbol reader of claim 3 wherein the first extension portion is parallel with the major axis of the head, and second extension portion is parallel with the major axis of the handle.

8. The machine-readable symbol reader of claim 7 wherein the handle, the head, and the L-shaped extension form a D-shape.

9. The machine-readable symbol reader of claim 3 wherein the second extension portion connects with the bottom surface of the head proximate a nose of the head.

10. The machine-readable symbol reader of claim 9 wherein the second extension portion includes a front surface facing the forward direction from which the light produced by the at least a first light source projects outwardly toward the exterior environment.

11. The machine-readable symbol reader of claim 1 wherein the extension forms a light pipe and includes a plurality of reflective or refractive structures that emit light as a plurality of light point sources distributed along the extension and oriented to emit light forwardly outward of the body.

12. The machine-readable symbol reader of claim 1 wherein the extension includes a light transmissive conduit and emits light forwardly outward of the body along at least a portion of the extension.

13. The machine-readable symbol reader of claim 12 wherein the light is emitted along an entire distance between a first location on the extension and a second location on the extension, the second location spaced from the first location.

14. The machine-readable symbol reader of claim 1 wherein the light is emitted at respective distinct locations spaced along the extension.

15. The machine-readable symbol reader of claim 14 wherein the respective locations are spaced a distance h from an optical axis given by a formula $$\frac{h}{r} - \frac{v}{r} -$$

$$\sin\phi - \left[\frac{d}{r} + (1-\cos\phi)\right]\tan\left\{2\phi + a\tan\left[\frac{\sin\phi + \frac{v}{r}}{\frac{n+d}{r} + (1-\cos\phi)}\right] - \Delta\alpha\right\} = 0,$$

where
r is a radius of a curved surface of a target object, d is a distance of the object from a main optics entrance pupil of the machine-readable symbol reader, n is the distance from a front nose to the main optics entrance pupil of the machine-readable symbol reader α is an incidence angle, v is a distance of a lateral displacement of a center of the cylinder from the optical axis of the optical system, and φ is an illuminating ray angle.

16. The machine-readable symbol reader of claim 14 wherein a first point source is at a bottom of the head spaced from the window by 10.0 mm, a second point source is spaced relatively below the head spaced from the window by 13.5 mm, a third point source is spaced relatively below the head spaced from the window by 17.1 mm, and a fourth point source is spaced relatively below the head spaced from the window by 20.7 mm.

17. The machine-readable symbol reader of claim 16 wherein a fifth point source is spaced relatively below the head spaced from the window by 24.5 mm, a sixth point source is spaced relatively below the head spaced from the window by 28.7 mm, a seventh point source is spaced relatively below the head spaced from the window by 33.2 mm; an eight point source is spaced relatively below the head spaced from the window by 38.4 mm, a ninth point source is spaced relatively below the head spaced from the window by 44.5 mm, a tenth point source is spaced relatively below the head spaced from the window by 52.3 mm, and an eleventh point source is spaced relatively below the head spaced from the window by 62.8 mm.

18. The machine-readable symbol reader of claim 1 wherein the extension includes a second window that faces in the forward direction and that provides a second return path for light returned from an exterior environment of the body of the machine-readable symbol reader, and further comprising:
a second light sensor, wherein the first light sensor is positioned in the head and the second light sensor is positioned in at least one of the handle or the extension to receive light via the second return path through the second window.

19. The machine-readable symbol reader of claim 1, further comprising:
at least a second light source physically coupled to the body, wherein light produced by at least the second light source light emits from at least the light emission portion of the extension of the body outwardly from the body of the machine-readable symbol reader into the exterior environment.

20. The machine-readable symbol reader of claim 19 wherein the first light source is positioned at least proximate the base of the handle, and the second light source is positioned in the head proximate a junction between the head and the extension.

21. The machine-readable symbol reader of claim 1 wherein the first light source is positioned in one of the head, the base of the handle, or the extension.

22. The machine-readable symbol reader of claim 1 wherein the first light sensor is a charge coupled device, and further comprising:
a decode engine communicatively coupled to the charge coupled device, and operable to decode images captured by the charge coupled device.

23. The machine-readable symbol reader of claim 1 wherein the first extension portion is an elongated extension that includes the light emission portion without a second extension portion being connected to the head.

24. A machine-readable symbol reader, comprising:
a body comprising a handle, a head, and an extension, wherein the handle includes a base, and a portion that extends along a major axis of the of the handle that is sized and dimensioned to be gripped by a human hand during use of the machine-readable symbol reader, wherein the head extends laterally at least in a forward direction from the handle at a junction of the handle and the head, and wherein the extension includes at least a first extension portion extending laterally from one of a front surface of the base of the handle in the forward direction and a second extension portion extending vertically from a bottom surface of the base of the head in the downward direction relative to the forward direction;
a first set of receiving optics housed in the head of the body having a first field of view that emanates from the head of the body and that provides a first return path for light returned from an exterior environment of the body of the machine-readable symbol reader to the head, wherein the exterior environment comprises a machine readable symbol located in a forward direction of the reader; and
a second set of receiving optics having a second field of view that emanates from a portion of the body other than the head and that provides a second return path for light returned from the exterior environment of the body of the machine-readable symbol reader to the portion of the body other than the head, the second return path different from the first return path, wherein the second set of receiving optics are housed in the handle of the body of the machine-readable symbol reader;
at least a first light sensor housed by the head and operable to sense light returned from the exterior environment of the body of the machine-readable symbol reader via the first return path;
at least a second light sensor housed by the portion of the body other than the head and operable to sense light returned from the exterior environment of the body of the machine-readable symbol reader via the second return path; and
at least a first light source physically coupled to the body, wherein light produced by at least the first light source light emits from at least a light emission portion of the body outwardly from the body of the machine-readable symbol reader into the exterior environment, the light emission portion of the body positioned relatively below the junction where the head extends from the handle; and at least a second light source located within the head, wherein light produced by the at least second light source emits light in the forward direction from the head into the exterior environment and is returned to at least one light sensor located in the head via the first return path.

25. The machine-readable symbol reader of claim 24 wherein the first light sensor is operable to sense light returned from the exterior environment of the body of the machine-readable symbol reader via the first return path, further comprising: at least a second light sensor housed by the body and operable to sense light returned from the exterior of the body of the machine-readable symbol reader via the second return path.

26. The machine-readable symbol reader of claim 24 wherein the light emission portion of the body is spaced relatively below a plane that passes through the junction where the head extends from the handle and that does not intersect the major axis of the head.

27. The machine-readable symbol reader of claim 24 wherein the light emission portion comprises an extension of the body that extends from at least one of the handle or the head.

28. The machine-readable symbol reader of claim 27 wherein the extension is extends laterally from the base of the handle in the forward direction, parallel with the head.

29. The machine-readable symbol reader of claim 27 wherein the extension is an L-shaped extension including a first extension portion that extends laterally from the handle, parallel with the head, and a second extension portion that extends from the head, parallel with the handle.

30. The machine-readable symbol reader of claim 29 wherein, in addition to the first light source, the machine-readable symbol reader includes a plurality of additional light sources, the first and the additional light sources distributed along the extension and oriented to emit light forwardly outward of the body.

31. The machine-readable symbol reader of claim 29 wherein the extension includes a plurality of apertures that emit light as a plurality of light point sources distributed along the extension and oriented to emit light forwardly outward of the body.

32. The machine-readable symbol reader of claim 29 wherein the extension forms a light pipe and includes a plurality of reflective or refractive structures that emit light as a plurality of light point sources distributed along the extension and oriented to emit light forwardly outward of the body.

33. The machine-readable symbol reader of claim 29 wherein the extension includes a light transmissive conduit and emits light forwardly outward of the body along at least a portion of the extension.

34. The machine-readable symbol reader of claim 33 wherein the light is emitted along an entire distance between a first location on the extension and a second location on the extension, the second location spaced from the first location.

35. The machine-readable symbol reader of claim 29 wherein the light is emitted at respective distinct locations spaced along the extension.

\* \* \* \* \*